(12) United States Patent
Wu et al.

(10) Patent No.: US 12,530,503 B2
(45) Date of Patent: Jan. 20, 2026

(54) INTEGRITY VERIFICATION METHOD AND RELATED DEVICE

(71) Applicant: Huawei Technologies Co., Ltd., Shenzhen (CN)

(72) Inventors: Di Wu, Shenzhen (CN); Bin Cao, Bangkok (TH); Wei Pan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 18/321,232

(22) Filed: May 22, 2023

(65) Prior Publication Data
US 2023/0297722 A1  Sep. 21, 2023

Related U.S. Application Data

(63) Continuation of application No. PCT/CN2021/130551, filed on Nov. 15, 2021.

(30) Foreign Application Priority Data

Nov. 20, 2020  (CN) .......................... 202011313900.3

(51) Int. Cl.
G06F 21/64 (2013.01)
H04L 9/06 (2006.01)
H04L 9/12 (2006.01)
H04L 9/32 (2006.01)
(Continued)

(52) U.S. Cl.
CPC ............ *G06F 21/64* (2013.01); *H04L 9/0643* (2013.01); *H04L 9/12* (2013.01); *H04L 9/3236* (2013.01); *H04L 9/3247* (2013.01); *H04L 9/3297* (2013.01); *H04L 63/0823* (2013.01);
(Continued)

(58) Field of Classification Search
None
See application file for complete search history.

(56) References Cited

U.S. PATENT DOCUMENTS 6,145,084 A * 11/2000 Zuili ....................... H04L 63/10
726/3
7,266,698 B2  9/2007 Matsumoto et al.
2015/0040240 A1  2/2015 Fakhraei et al.
(Continued)

FOREIGN PATENT DOCUMENTS

CN  104202168 A  12/2014
CN  111597590 A  8/2020
(Continued)

OTHER PUBLICATIONS

Haiyan Wang and Jiawei Zhang; (Blockchain Based Data Integrity Verification for Large-Scale IoT Data); pp. 11; IEEE date of publication Nov. 11, 2019; Date of current version Nov. 22, 2019.*

*Primary Examiner* — Ali H. Cheema
(74) *Attorney, Agent, or Firm* — Conley Rose, P.C.

(57) ABSTRACT

An integrity verification method includes: a first device that sends first data to a second device. The first device sends an integrity measurement baseline value corresponding to the first data to a verification server, and the second device sends an integrity measurement value corresponding to the first data to the verification server. The verification server performs integrity verification on the first data based on the integrity measurement value and the integrity measurement baseline value.

15 Claims, 7 Drawing Sheets

(51) Int. Cl.
*H04L 9/40* (2022.01)
*H04W 12/106* (2021.01)

(52) U.S. Cl.
CPC .......... *H04L 63/101* (2013.01); *H04L 63/123* (2013.01); *H04W 12/106* (2021.01)

(56) References Cited

U.S. PATENT DOCUMENTS

| | | | |
|---|---|---|---|
| 2016/0366109 A1* | 12/2016 | Lablans | G06Q 20/34 |
| 2019/0158698 A1* | 5/2019 | Chen | H04N 19/85 |
| 2020/0106616 A1* | 4/2020 | Rule | G06F 21/35 |
| 2020/0169573 A1* | 5/2020 | Giladi | H04L 63/123 |
| 2020/0380143 A1* | 12/2020 | Circosta | H04L 51/18 |
| 2021/0044976 A1* | 2/2021 | Avetisov | H04W 12/08 |

FOREIGN PATENT DOCUMENTS

| | | | | |
|---|---|---|---|---|
| EP | 0676877 A2 | * | 10/1995 | ......... H04N 1/32133 |
| JP | 2007220073 A | * | 8/2007 | ........... H04N 1/4426 |
| JP | 2019159586 A | * | 9/2019 | |
| WO | 2016172473 A1 | | 10/2016 | |

* cited by examiner

INTEGRITY VERIFICATION METHOD AND RELATED DEVICE

CROSS-REFERENCE TO RELATED APPLICATIONS

This is a continuation of International Patent Application No. PCT/CN2021/130551 filed on Nov. 15, 2021, which claims priority to Chinese Patent Application No. 202011313900.3 filed on Nov. 20, 2020. The disclosures of the aforementioned applications are hereby incorporated by reference in their entireties.

TECHNICAL FIELD

This disclosure relates to the field of communication technologies, and in particular, to an integrity verification method and a related device.

BACKGROUND

Generally, some data is exchanged between devices to guide a receiving end to process to-be-transmitted data. To ensure normal running of a service, the data exchanged between the devices needs to be consistent at a transmitting end and the receiving end. Therefore, the data stored at the transmitting end and the receiving end needs to be verified. For example, a control and management device sends some data to a terminal device, and the data guides the terminal device to process a packet. The data on the terminal device for guiding packet processing is required to be from the control and management device and be consistent with data delivered by the control and management device. Once the data is inconsistent, it indicates that the data on the terminal device for guiding packet processing may be unreliable. Based on this, the data on the terminal device for guiding packet processing and corresponding data on the control and management device need to be verified.

Using verification on data sent by the control and management device to the terminal device as an example, the terminal device reports full data received from the control and management device to the control and management device, and the control and management device compares the received data with locally stored data. If the data is consistent, it indicates that the data on the terminal device for guiding packet processing is accurate. If the data is inconsistent, it indicates that the data on the terminal device for guiding packet processing is inaccurate. However, in this implementation, to verify the data on the terminal device and the control and management device, a large amount of information needs to be exchanged between the terminal device and the control and management device, so that a large quantity of network resources need to be occupied. In addition, a verification result is not secure and accurate enough when the verification is performed by exchanging and comparing the full data.

SUMMARY

Embodiments of this disclosure provide an integrity verification method and a related device. A transmitting end and a receiving end of data respectively send an integrity measurement value and an integrity measurement baseline value of the data to a trusted verification server, and the verification server verifies integrity of the data, to ensure that the integrity verification on the data at the transmitting end and the receiving end is efficiently and reliably completed. Therefore, normal running of a service is ensured.

According to a first aspect, an embodiment of this disclosure provides an integrity verification method. The method may include the following. After a first device sends first data to a second device, the first device sends an integrity measurement baseline value corresponding to the first data to a verification server, and the second device sends an integrity measurement value corresponding to the first data to the verification server. In this way, the verification server may perform integrity verification on the first data based on the integrity measurement value and the integrity measurement baseline value. In this way, the trusted verification server performs the integrity verification on the integrity measurement value and the integrity measurement baseline value that correspond to the same first data respectively sent by the first device and the second device. Only the integrity measurement value and the integrity measurement baseline value that correspond to the first data need to be exchanged, and no full first data needs to be exchanged. This effectively reduces an amount of data that needs to be exchanged during verification, and greatly saves resources occupied in a verification process. In addition, the trusted verification server is introduced, instead of directly comparing the first data by the first device, the verification server performs the integrity verification on the integrity measurement value and the integrity measurement baseline value. This can ensure that the verification process is more secure and reliable, and ensures normal running of a service on the second device.

The first device may be a control and management device, and the second device may be a terminal device. Alternatively, the first device may be a terminal device, and the second device may be a control and management device. Alternatively, both the first device and the second device may be terminal devices.

In an example, the first data may include at least one of the following: segment routing (SR) traffic engineering (TE) configuration information, SR TE-policy configuration information, access control list (ACL) configuration information, or flow specification (FlowSpec) configuration information.

The integrity measurement baseline value may be a hash value obtained through hash calculation, and the integrity measurement value is a hash value obtained through hash calculation. Alternatively, the integrity measurement baseline value may be a digital signature, and the integrity measurement value is a digital signature. Alternatively, the integrity measurement baseline value may be an encrypted value obtained through encryption processing, and the integrity measurement value is an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data. For example, data to be verified by the first device is data a and data b, and data to be verified by the second device is also data a and data b.

In a possible implementation, before the first device sends the integrity measurement baseline value of the first data to the verification server, the first device may further calculate the integrity measurement baseline value corresponding to the first data, and before the second device sends the integrity measurement value of the first data to the verification server, the second device may further calculate the integrity measurement value corresponding to the first data. In an example, that the first device calculates the integrity measurement baseline value corresponding to the first data may include the following. The first device determines the integrity measurement baseline value based on all content of the first data. That the second device calculates the integrity measurement value corresponding to the first data may include the following. The second device determines the integrity measurement value based on all the content of the first data. The first device and the second device store the first data in a same sequence, to ensure that verification values calculated based on all the content of the first data are in correspondence. This ensures accurate execution of the integrity verification. In another example, that the first device calculates the integrity measurement baseline value corresponding to the first data may include the following. The first device determines the integrity measurement baseline value based on partial content of the first data. That the second device calculates the integrity measurement value corresponding to the first data may include the following. The second device determines the integrity measurement value based on the partial content of the first data. Rules for obtaining the partial content of the first data on the first device and the second device are the same. This ensures that verification values calculated based on the partial content of the first data are in correspondence, and ensures accurate execution of the integrity verification. In still another example, that the first device calculates the integrity measurement baseline value corresponding to the first data may include the following. The first device determines the integrity measurement baseline value based on a first operation log corresponding to sending of the first data. That the second device calculates the integrity measurement value corresponding to the first data may include the following. The second device determines the integrity measurement value based on a second operation log corresponding to receiving of the first data. Rules for generating operation logs for data sending and receiving on the first device and the second device may be the same. This ensures that verification values obtained based on the first operation log corresponding to the first data and the second operation log corresponding to the first data are in correspondence, and ensures accurate execution of the integrity verification.

In a possible implementation, that the second device sends the integrity measurement value corresponding to the first data to the verification server may be triggered based on a received first indication, or may be triggered after a local preset condition is satisfied. In an example, before the second device sends the integrity measurement value corresponding to the first data to the verification server, the second device may further receive the first indication, where the first indication indicates the second device to perform the integrity verification on the first data. The first indication may be sent by the first device to the second device, or the first indication may be sent by the verification server to the second device. In another example, before the second device sends the integrity measurement value corresponding to the first data to the verification server, the second device may further generate the integrity measurement value when determining that the preset condition is satisfied. The preset condition includes at least one of the following. Condition 1: a total length of the received first data reaches a preset length threshold, Condition 2: a quantity of entries included in the received first data reaches a preset quantity threshold, Condition 3: accumulated duration of receiving the first data reaches preset duration, or Condition 4: the first data is incremental data. In this way, the second device may be triggered to calculate the integrity measurement value corresponding to the first data and send the integrity measurement value to the verification server, so that the verification server verifies integrity of the first data.

According to a second aspect, an embodiment of this disclosure further provides an integrity verification method. The method may be applied to a first device. For example, the method may include the following. After the first device sends first data to a second device, the first device sends an integrity measurement baseline value corresponding to the first data to a verification server, where the integrity measurement baseline value is used to perform integrity verification on the first data.

The first device may be a control and management device, and the second device may be a terminal device. Alternatively, the first device may be a terminal device, and the second device may be a control and management device. Alternatively, both the first device and the second device may be terminal devices.

In an example, the first data may include at least one of the following: SR TE configuration information, SR TE-policy configuration information, ACL configuration information, or FlowSpec configuration information.

The integrity measurement baseline value may be a hash value obtained through hash calculation, or the integrity measurement baseline value may be a digital signature, or the integrity measurement baseline value may be an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, before the first device sends the integrity measurement baseline value of the first data to the verification server, the first device may further calculate the integrity measurement baseline value corresponding to the first data. In an example, that the first device calculates the integrity measurement baseline value corresponding to the first data may include the following. The first device determines the integrity measurement baseline value based on all content of the first data. In another example, that the first device calculates the integrity measurement baseline value corresponding to the first data may include the following. The first device determines the integrity measurement baseline value based on partial content of the first data. In still another example, that the first device calculates the integrity measurement baseline value corresponding to the first data may include the following. The first device determines the integrity measurement baseline value based on a first operation log corresponding to sending of the first data.

In a possible implementation, the first device may send a first indication to the second device, where the first indication indicates the second device to perform the integrity verification on the first data. The first indication may be directly sent by the first device to the second device, or the first indication may be sent by the first device to the second device via the verification server.

It should be noted that in the method provided in the second aspect, the first device may be the first device in the method provided in the first aspect. Therefore, for a specific implementation and achieved effects of the method provided in the second aspect, refer to related descriptions of the first aspect.

According to a third aspect, an embodiment of this disclosure further provides an integrity verification method. The method is applied to a second device. For example, the method may include the following. After the second device receives first data sent by a first device, the second device sends an integrity measurement value corresponding to the first data to a verification server, where the integrity measurement value is used to perform integrity verification on the first data.

The first device may be a control and management device, and the second device may be a terminal device. Alternatively, the first device may be a terminal device, and the second device may be a control and management device. Alternatively, both the first device and the second device may be terminal devices.

In an example, the first data may include at least one of the following: SR TE configuration information, SR TE-policy configuration information, ACL configuration information, or FlowSpec configuration information.

The integrity measurement value may be a hash value obtained through hash calculation, or the integrity measurement value may be a digital signature, or the integrity measurement value may be an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, before the second device sends the integrity measurement value of the first data to the verification server, the second device may further calculate the integrity measurement value corresponding to the first data. In an example, that the second device calculates the integrity measurement value corresponding to the first data may include the following. The second device determines the integrity measurement value based on all content of the first data. In another example, that the second device calculates the integrity measurement value corresponding to the first data may include the following. The second device determines the integrity measurement value based on partial content of the first data. In still another example, that the second device calculates the integrity measurement value corresponding to the first data may include the following. The second device determines the integrity measurement value based on a second operation log corresponding to receiving of the first data.

In a possible implementation, that the second device sends the integrity measurement value corresponding to the first data to the verification server may be triggered based on a received first indication, or may be triggered after a local preset condition is satisfied. In an example, before the second device sends the integrity measurement value corresponding to the first data to the verification server, the second device may further receive the first indication, where the first indication indicates the second device to perform the integrity verification on the first data. The first indication may be sent by the first device to the second device, or the first indication may be sent by the verification server to the second device. In another example, before the second device sends the integrity measurement value corresponding to the first data to the verification server, the second device may further generate the integrity measurement value when determining that the preset condition is satisfied. The preset condition includes at least one of the following. Condition 1: a total length of the received first data reaches a preset length threshold, Condition 2: a quantity of entries included in the received first data reaches a preset quantity threshold, Condition 3: accumulated duration of receiving the first data reaches preset duration, or Condition 4: the first data is incremental data. In this way, the second device may be triggered to calculate the integrity measurement value corresponding to the first data and send the integrity measurement value to the verification server, so that the verification server verifies integrity of the first data.

It should be noted that in the method provided in the third aspect, the second device may be the second device in the method provided in the first aspect. Therefore, for a specific implementation and achieved effects of the method provided in the third aspect, refer to related descriptions of the first aspect.

According to a fourth aspect, an embodiment of this disclosure further provides an integrity verification method. The method is applied to a verification server. For example, the method may include the following. The verification server receives an integrity measurement baseline value that corresponds first data and that is sent by a first device and an integrity measurement value that corresponds the first data and that is sent by a second device. The first data is sent by the first device to the second device. In this case, the verification server performs integrity verification on the first data based on the integrity measurement baseline value and the integrity measurement value.

The first device may be a control and management device, and the second device may be a terminal device. Alternatively, the first device may be a terminal device, and the second device may be a control and management device. Alternatively, both the first device and the second device may be terminal devices.

In an example, the first data may include at least one of the following: SR TE configuration information, SR TE-policy configuration information, ACL configuration information, or FlowSpec configuration information.

The integrity measurement baseline value may be a hash value obtained through hash calculation, and the integrity measurement value is a hash value obtained through hash calculation. Alternatively, the integrity measurement baseline value may be a digital signature, and the integrity measurement value is a digital signature. Alternatively, the integrity measurement baseline value may be an encrypted value obtained through encryption processing, and the integrity measurement value is an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, that the second device sends the integrity measurement value corresponding to the first data to the verification server may be triggered based on a received indication. In an example, the verification server may receive a first indication sent by the first device, where the first indication indicates the verification server to perform the integrity verification on the first data. In response to the first indication, the verification server may further send a second indication to the second device, where the second indication indicates to perform the integrity verification on the first data. In this way, the second device may calculate, based on the second indication, the integrity measurement value corresponding to the first data and send the integrity measurement value to the verification server.

In some possible implementations, that the verification server performs the integrity verification on the first data based on the integrity measurement baseline value and the integrity measurement value may include the following. The verification server determines that the integrity measurement value matches the integrity measurement baseline value, so that the verification server determines that the integrity verification on the first data succeeds.

In an example, the integrity measurement baseline value of the first data is a first hash value obtained by performing calculation on all content of the first data (or partial content of the first data, or a first operation log corresponding to sending of the first data) by using a first hash algorithm, and the integrity measurement value of the first data is a second hash value obtained by performing calculation on all the content of the first data (or the partial content of the first data, or a second operation log corresponding to receiving of the first data) by using the first hash algorithm. In this case, the verification server may determine whether the first hash value is consistent with the second hash value. If the first hash value is consistent with the second hash value, the verification server determines that the integrity verification on the first data succeeds, otherwise, the verification server determines that the integrity verification on the first data fails.

In another example, the integrity measurement baseline value of the first data is a first signature obtained, based on all content of the first data (or partial content of the first data, or a first operation log corresponding to sending of the first data), by performing a signature operation on a first hash value by using a first private key, and the integrity measurement value of the first data is a second signature obtained by performing a signature operation on a second hash value on all the content of the first data (or the partial content of the first data, or a second operation log corresponding to receiving of the first data) by using a second private key. In one case, the verification server may first determine whether a first public key corresponding to the first private key is the same as a second public key corresponding to the second private key. If the first public key is the same as the second public key, the verification server determines whether the first signature is consistent with the second signature. If the first signature is consistent with the second signature, the verification server determines that the integrity verification on the first data succeeds, otherwise, the verification server determines that the integrity verification on the first data fails. In another case, the verification server may first process the first signature by using a first public key corresponding to the first private key, to obtain the first hash value, process the second signature by using a second public key corresponding to the second private key, to obtain the second hash value, and then determine whether the first hash value is consistent with the second hash value. If the first hash value is consistent with the second hash value, the verification server determines that the integrity verification on the first data succeeds, otherwise, the verification server determines that the integrity verification on the first data fails. The first public key may be a public key corresponding to a first private key corresponding to the control and management device, and the public key may be locally stored in the verification server in advance, or may be sent by the control and management device to the verification server when the control and management device sends the integrity measurement baseline value of the first data to the verification server. Similarly, the second public key may be a public key corresponding to a second private key corresponding to the terminal device, and the public key may be locally stored in the verification server in advance, or may be sent by the terminal device to the verification server when the terminal device sends the integrity measurement value of the first data to the verification server.

In still another example, the integrity measurement baseline value of the first data is a first encrypted value obtained by performing calculation on all content of the first data (or partial content of the first data, or a first operation log corresponding to sending of the first data) by using a first encryption algorithm, and the integrity measurement value of the first data is a second encrypted value obtained by performing calculation on all the content of the first data (or the partial content of the first data, or a second operation log corresponding to receiving of the first data) by using the first encryption algorithm. In one case, the verification server may determine whether the first encrypted value is consistent with the second encrypted value. If the first encrypted value is consistent with the second encrypted value, the verification server determines that the integrity verification on the first data succeeds, otherwise, the verification server determines that the integrity verification on the first data fails. In another case, the verification server may alternatively first decrypt the first encrypted value by using a first decryption algorithm corresponding to the first encryption algorithm, to obtain a first decrypted value, decrypt the second encrypted value by using the first decryption algorithm corresponding to the first encryption algorithm, to obtain a second decrypted value, and then determine whether the first decrypted value is consistent with the second decrypted value. If the first decrypted value is consistent with the second decrypted value, the verification server determines that the integrity verification on the first data succeeds, otherwise, the verification server determines that the integrity verification on the first data fails.

When the integrity verification on the first data fails, to enable the control and management device to sense a problem of consistency of the first data between the control and management device and the terminal device, the verification server may send an alarm message to the control and management device, to notify the control and management device that the first data on the terminal device is abnormal. After receiving the alarm message, to ensure that the terminal device can continue to run normally, the control and management device may further send the first data to the terminal device again, to indicate the terminal device to replace the locally stored first data with newly received first data, or indicate the terminal device to store newly received first data and add an aging flag to previously stored first data. The first data to which the aging flag is added cannot be used to guide the terminal device to process a packet, but the newly received first data is used to guide the terminal device to process the packet.

It should be noted that in the method provided in the fourth aspect, the verification server may be the verification server in the method provided in the first aspect. Therefore, for a specific implementation and achieved effects of the method provided in the fourth aspect, refer to related descriptions of the first aspect.

It should be noted that, for data sent in batches, to ensure a secure and accurate verification, the integrity verification may be performed periodically. For data sent incrementally, the integrity verification may be performed on incremental data in real time.

According to a fifth aspect, this disclosure further provides a network system, including a first device, a second device, and a verification server. The first device is configured to perform the method according to any one of the second aspect or the possible implementations of the second aspect, or perform an operation performed by the first device in the method according to any one of the first aspect or the possible implementations of the first aspect. The second device is configured to perform the method according to any one of the third aspect or the possible implementations of the third aspect, or perform an operation performed by the second device in the method according to any one of the first aspect or the possible implementations of the first aspect. The verification server is configured to perform the method according to any one of the fourth aspect or the possible implementations of the fourth aspect, or perform an operation performed by the verification server in the method according to any one of the first aspect or the possible implementations of the first aspect.

According to a sixth aspect, an embodiment of this disclosure further provides a first device, including a transceiver unit and a processing unit. The transceiver unit is configured to perform a sending and receiving operation performed by the first device in the method according to any one of the first aspect, the possible implementations of the first aspect, the second aspect, or the possible implementations of the second aspect. The processing unit is configured to perform an operation performed by the first device in the method according to any one of the first aspect, the possible implementations of the first aspect, the second aspect, or the possible implementations of the second aspect other than the sending and receiving operation. For example, when the first device performs the method according to the second aspect, the transceiver unit is configured to send first data to a second device, and send an integrity measurement baseline value corresponding to the first data to a verification server. The processing unit is configured to determine the integrity measurement baseline value based on all content of the first data.

According to a seventh aspect, an embodiment of this disclosure further provides a second device, including a transceiver unit and a processing unit. The transceiver unit is configured to perform a sending and receiving operation performed by the second device in the method according to any one of the first aspect, the possible implementations of the first aspect, the third aspect, or the possible implementations of the third aspect. The processing unit is configured to perform an operation performed by the second device in the method according to any one of the first aspect, the possible implementations of the first aspect, the third aspect, or the possible implementations of the third aspect other than the sending and receiving operation. For example, when the second device performs the method according to the third aspect, the transceiver unit is configured to receive first data sent by a first device, and send an integrity measurement value corresponding to the first data to a verification server. The processing unit is configured to determine the integrity measurement value based on all content of the first data.

According to an eighth aspect, an embodiment of this disclosure further provides a verification server, including a transceiver unit and a processing unit. The transceiver unit is configured to perform a sending and receiving operation performed by the verification server in the method according to any one of the first aspect, the possible implementations of the first aspect, the fourth aspect, or the possible implementations of the fourth aspect. The processing unit is configured to perform an operation performed by the verification server in the method according to any one of the first aspect, the possible implementations of the first aspect, the fourth aspect, or the possible implementations of the fourth aspect other than the sending and receiving operation. For example, when the verification server performs the method according to the fourth aspect, the transceiver unit is configured to receive an integrity measurement baseline value that corresponds first data and that is sent by a first device, and receive an integrity measurement value that corresponds to the first data and that is sent by a second device. The processing unit is configured to perform integrity verification on the first data based on the integrity measurement baseline value and the integrity measurement value.

According to a ninth aspect, an embodiment of this disclosure further provides a first device, including a first communication interface and a processor. The first communication interface is configured to perform a sending operation performed by the first device in the method according to any one of the first aspect, the possible implementations of the first aspect, the second aspect, or the possible implementations of the second aspect. The processor is configured to perform an operation performed by the first device in the method according to any one of the first aspect, the possible implementations of the first aspect, the second aspect, or the possible implementations of the second aspect other than the sending and receiving operation. The first device may further include a second communication interface, and the second communication interface is configured to perform the receiving operation of the first device.

According to a tenth aspect, an embodiment of this disclosure further provides a second device, including a first communication interface and a second communication interface. The first communication interface is configured to perform a sending operation performed by the second device in the method according to any one of the first aspect, the possible implementations of the first aspect, the third aspect, or the possible implementations of the third aspect. The second communication interface is configured to perform a receiving operation performed by the second device in the method according to any one of the first aspect, the possible implementations of the first aspect, the third aspect, or the possible implementations of the third aspect. In addition, the second device may further include a processor configured to perform an operation performed by the second device in the method according to any one of the first aspect, the possible implementations of the first aspect, the third aspect, or the possible implementations of the third aspect other than the receiving and sending operation.

According to an eleventh aspect, an embodiment of this disclosure further provides a verification server, including a first communication interface and a processor. The first communication interface is configured to perform a receiving operation performed by the verification server in the method according to any one of the first aspect, the possible implementations of the first aspect, the fourth aspect, or the possible implementations of the fourth aspect. The processor is configured to perform an operation performed by the verification server in the method according to any one of the first aspect, the possible implementations of the first aspect, the fourth aspect, or the possible implementations of the fourth aspect other than the sending and receiving operation. The verification server may further include a second communication interface, and the second communication interface is configured to perform a sending operation of the first device.

According to a twelfth aspect, an embodiment of this disclosure further provides a first device. The first device includes a memory and a processor. The memory includes computer-readable instructions. The processor that communicates with the memory is configured to execute the computer-readable instructions, so that the first device is configured to perform a part corresponding to the first device in the method according to any one of the first aspect, the possible implementations of the first aspect, the second aspect, or the possible implementations of the second aspect.

According to a thirteenth aspect, an embodiment of this disclosure further provides a second device. The second device includes a memory and a processor. The memory includes computer-readable instructions. The processor that communicates with the memory is configured to execute the computer-readable instructions, so that the second device is configured to perform a part corresponding to the second device in the method according to any one of the first aspect, the possible implementations of the first aspect, the third aspect, or the possible implementations of the third aspect.

According to a fourteenth aspect, an embodiment of this disclosure further provides a verification server. The verification server includes a memory and a processor. The memory includes computer-readable instructions. The processor that communicates with the memory is configured to execute the computer-readable instructions, so that the verification server is configured to perform a part corresponding to the verification server in the method according to any one of the first aspect, the possible implementations of the first aspect, the fourth aspect, or the possible implementations of the fourth aspect.

According to a fifteenth aspect, an embodiment of this disclosure further provides a communication system. The communication system includes the first device according to the sixth aspect, the ninth aspect, or the twelfth aspect, the second device according to the seventh aspect, the tenth aspect, or the thirteenth aspect, and the verification server according to the eighth aspect, the eleventh aspect, or the fourteenth aspect.

According to a sixteenth aspect, an embodiment of this disclosure further provides a computer-readable storage medium. The computer-readable storage medium stores instructions, and when the instructions are run on a computer, the computer is enabled to perform the method according to any one of the first aspect or the possible implementations of the first aspect, any one of the second aspect or the possible implementations of the second aspect, any one of the third aspect or the possible implementations of the third aspect, and any one of the fourth aspect or the possible implementations of the fourth aspect.

According to a seventeenth aspect, an embodiment of this disclosure further provides a computer program product including a computer program or computer-readable instructions. When the computer program or the computer-readable instructions is or are run on a computer, the computer is enabled to perform the method according to any one of the first aspect or the possible implementations of the first aspect, any one of the second aspect or the possible implementations of the second aspect, any one of the third aspect or the possible implementations of the third aspect, and any one of the fourth aspect or the possible implementations of the fourth aspect.

It should be noted that, the first device, the second device, and the verification server in the foregoing embodiments may be network devices configured to perform the foregoing methods, or may be boards, line cards, chips, or the like configured to perform the foregoing methods.

DESCRIPTION OF EMBODIMENTS

Figure 1:
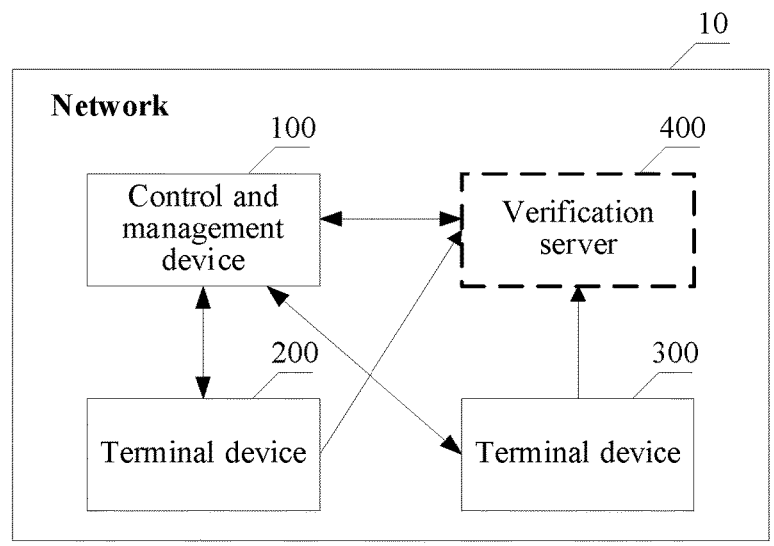
FIG. 1 is a schematic diagram of a structure of a network to which an embodiment of this disclosure is applicable.

The following describes technical solutions of embodiments in this disclosure with reference to accompanying drawings. A network architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that, with the evolution of the network architecture and the emergence of new service scenarios, the technical solutions provided in embodiments of this disclosure are also applicable to similar technical problems.

Ordinal numbers such as "1", "2", "3", "first", "second", and "third" in this disclosure are used to distinguish between a plurality of objects, but are not intended to limit a sequence of the plurality of objects.

It should be understood that "A and/or B" mentioned in this disclosure includes the following cases: only A is included, only B is included, or both A and B are included.

A first device may send data to a second device, and the data may be used as a basis for processing to-be-transmitted data such as a packet by the second device. To ensure normal running of a service on the second device, data received by the second device from the first device and data sent by the first device to the second device need to be ensured, in other words, the data stored in the second device and the data stored in the first device need to be verified. The first device and the second device may be any devices that need to keep data consistency. For example, the first device may be a control and management device, and the second device may be a terminal device. For another example, the first device may be a terminal device, and the second device may be a control and management device. For still another example, both the first device and the second device may be terminal devices. In embodiments of this disclosure, an example in which the first device is a control and management device and the second device is a terminal device is used for description.

The terminal device may process to-be-transmitted data based on some data sent by the control and management device. For example, the data may include SR TE configuration information, SR TE-policy configuration information, ACL configuration information, or FlowSpec configuration information. After the terminal device receives the data sent by the control and management device, if an error occurs or the data is tampered with in a process such as storage and use, data for guiding packet processing is inconsistent with the data sent by the control and management device. As a result, packet processing performed by the terminal device is unreliable, affecting normal running of a service. Based on this, to ensure normal running of the service, it needs to be ensured that the data for guiding packet processing received by the terminal device from the control and management device is consistent with the data sent by the control and management device to the terminal device.

Consistency between the data on the terminal device and the data on the control and management device is generally verified by the control and management device in a reconciliation manner. The reconciliation manner may be that the terminal device periodically sends, to the control and management device, data for guiding packet processing, and the control and management device compares the received data with corresponding data sent by the control and management device to the terminal device, to determine whether the data on the terminal device for guiding packet processing in this period is reliable.

For example, a network 10 shown in FIG. 1 is used as an example. It is assumed that the network 10 may include at least a control and management device 100, a terminal device 200, and a terminal device 300. Each terminal device has at least a packet processing capability. The control and management device 100 may be capable of exchanging data with each terminal device, for example, sending, separately to the terminal device 200 and the terminal device 300, data for guiding packet processing, to implement management and control on the terminal device 200 and the terminal device 300. It should be noted that, a quantity of terminal devices included in the network 10 is not limited in embodiments of this disclosure. For example, there may be more than two terminal devices, in other words, in addition to the terminal device 200 and the terminal device 300, another terminal device is further included. Alternatively, a quantity of terminal devices included in the network 10 may be less than 2.

In an example, the control and management device 100 sends data 1 to the terminal device 200, and the terminal device 200 may store the data 1, and guide packet processing based on the locally stored data 1. Assuming that a preset reconciliation period is one hour, the terminal device 200 sends locally stored data 1' (where if the data on the terminal device 200 is not tampered with or no error occurs in the data, the data 1' is the same as the data 1) to the control and management device 100 every one hour, and the control and management device 100 compares the locally stored data 1 with the data 1'. If a comparison result indicates that the data 1 is consistent with the data 1', it is determined that the terminal device 200 does not tamper with the data 1 received from the control and management device 100 and no error occurs in the data 1 in this period, and the terminal device 200 is reliable in this period. In other words, normal running of a service can be ensured when the terminal device 200 performs packet processing based on the data 1' in this period. On the contrary, if the comparison result indicates that the data 1 is inconsistent with the data 1', it is determined that the terminal device 200 tampers with the data 1 received from the control and management device 100 or an error occurs in the data 1 in this period. In this case, normal running of a service cannot be ensured when the terminal device 200 performs packet processing based on the data 1' in this period.

However, because the data on the terminal device and the data on the control and management device are verified by the control and management device in the reconciliation manner, in an aspect, the terminal device needs to report, to the control and management device in each period, full locally stored data from the control and management device, and a large amount of data is exchanged each time and occupies a large quantity of resources. In another aspect, a verification result is not secure and reliable by comparing full data.

Based on this, an embodiment of this disclosure provides an integrity verification method, and a trusted verification server is introduced to perform a remote integrity verification on data sent by a control and management device to a terminal device. For example, the process may include the following. After the control and management device sends first data to the terminal device, the control and management device generates and sends an integrity measurement baseline value corresponding to the first data to the verification server. The terminal device that receives the first data may also generate and send an integrity measurement value corresponding to the first data to the verification server. The trusted verification server may perform integrity verification on the first data based on the integrity measurement value from the terminal device and the integrity measurement baseline value from the control and management device. When the integrity verification on the first data succeeds, it indicates that the first data stored in the terminal device is consistent with the first data stored in the control and management device, otherwise, when the integrity verification on the first data fails, it indicates that the first data stored in the terminal device is inconsistent with the first data stored in the control and management device. In this way, the trusted verification server performs the integrity verification on the integrity measurement value and the integrity measurement baseline value that correspond to the same first data respectively sent by the terminal device and the control and management device. Only the integrity measurement value and the integrity measurement baseline value that correspond to the first data need to be exchanged, and no full first data needs to be exchanged. This effectively reduces an amount of data that needs to be exchanged during verification, and greatly saves resources occupied in a verification process. In addition, the trusted verification server is introduced, instead of directly comparing the first data by the control and management device, the verification server performs the integrity verification on the integrity measurement value and the integrity measurement baseline value. This can ensure that the verification process is more secure and reliable, and ensures normal running of a service on the terminal device.

The network 10 shown in FIG. 1 is still used as an example. The network 10 may further include a verification server 400. For example, a process that the verification server 400 can exchange data with the control and management device 100 and each terminal device, and is configured to perform integrity verification on the control and management device 100 and each terminal device provided in embodiments of this disclosure may include the following steps. S11: The control and management device 100 sends data a to the terminal device 200. S12: The control and management device 100 generates, based on a private key 1, a signature 1 corresponding to the data a, and sends, to the verification server 400, the signature 1 used as an integrity measurement baseline value corresponding to the data a. S13: The terminal device 200 generates, based on a private key 2, a signature 2 corresponding to the data a, and sends, to the verification server 400, the signature 2 used as an integrity measurement value corresponding to the data a. S14: The verification server 400 processes the received signature 1 based on a public key 1 to obtain a digest 1, and processes the received signature 2 based on a public key 2 to obtain a digest 2, where the public key 1 corresponds to the private key 1, and the public key 2 corresponds to the private key 2. S15: The verification server 400 determines whether the digest 1 is consistent with the digest 2. If the digest 1 is consistent with the digest 2, it indicates that the integrity verification on the data a succeeds, if the digest 1 is inconsistent with the digest 2, it indicates that the integrity verification on the data a fails. If determining that the integrity verification on the data a fails, the verification server 400 may further send an alarm message to the control and management device 100, to notify the terminal device 200 that the data a is abnormal, so that the control and management device 100 may resend the data a to the terminal device 200 based on an indication of the alarm message. In this way, the terminal device 200 may replace the locally stored data a with the newly received data a, to provide a more reliable packet processing function.

It may be understood that, the scenario is merely a scenario example provided in embodiments of this disclosure, but embodiments of this disclosure are not limited to the scenario.

In embodiments of this disclosure, the terminal device is any device that can implement a function of processing to-be-transmitted data. For example, the terminal device may be a network device such as a switch or a router, or may be user equipment such as a mobile phone or a computer. The control and management device is any device that has a management and/or control function for the terminal device, for example, may be a network cloud engine (NCE), a server, a network management system, or a router. Alternatively, the control management entity may be a functional entity integrated in any device, and the functional entity may be represented in a form of hardware or in a form of software, for example, may be a Telnet (an application layer protocol) console or a Secure Shell Protocol (SSH) console in a device. The Telnet console may be used in the Internet and a local area network, and uses virtual terminals to provide bidirectional and character string-based command line interface interaction functions. The SSH console is a secure protocol established based on an application layer and a transport layer. The verification server may be a trusted remote attestation server. The verification server and the control and management device may be co-deployed in a same entity device as two functional units in the entity device. Alternatively, the verification server may be an independent and trusted third-party entity device, for example, may be a certificate authority (CA) server. It should be noted that various devices in embodiments of this disclosure are not limited in embodiments of this disclosure.

With reference to the accompanying drawings, the following uses an embodiment to describe in detail a specific implementation of an integrity verification method in embodiments of this disclosure.

Figure 2:
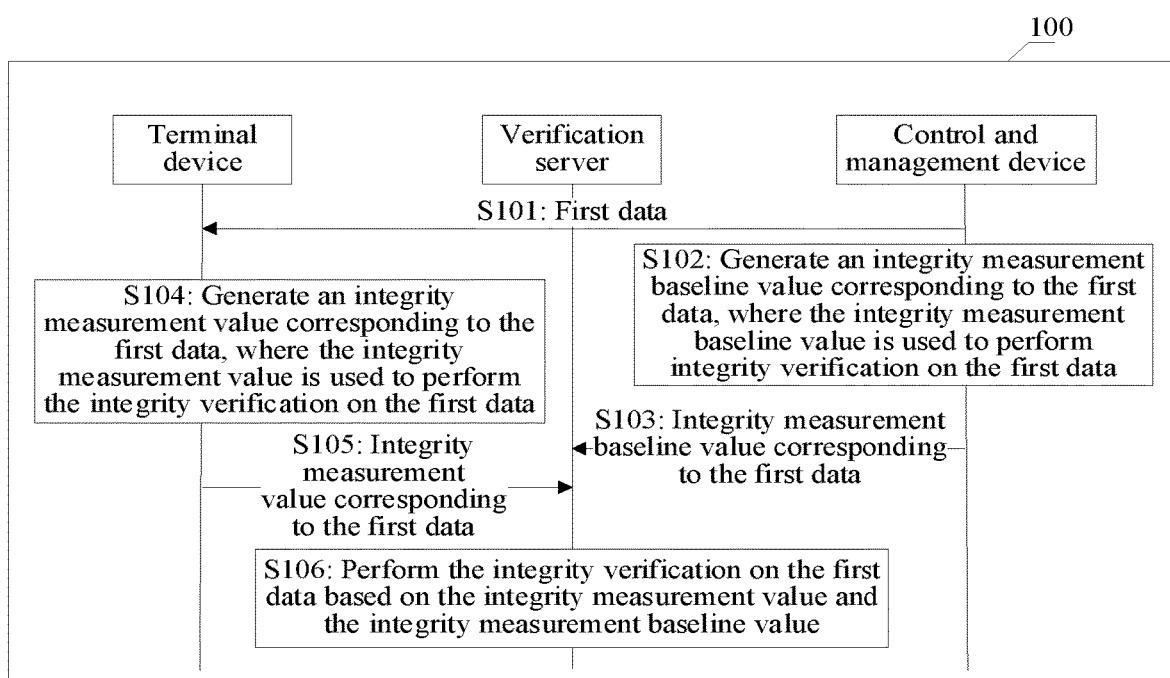
FIG. 2 is a schematic flowchart of an integrity verification method according to an embodiment of this disclosure.

FIG. 2 is a schematic flowchart of an integrity verification method 100 according to an embodiment of this disclosure. The method 100 is described through interaction between a terminal device, a control and management device, and a verification server. The terminal device may be the terminal device 200 or the terminal device 300 in FIG. 1, the control and management device may be the control and management device 100 in FIG. 1, and the verification server may be the verification server 400 in FIG. 1. Refer to FIG. 2. The method 100 may include, for example, the following S101 to S106.

S101: The control and management device sends first data to the terminal device.

The first data may be any data sent by the control and management device to the terminal device. The first data may be directly or indirectly used by the terminal device to guide packet processing. For example, the first data may include at least one of the following types of data: SR TE configuration information, SR TE-policy configuration information, ACL configuration information, or FlowSpec configuration information.

If the first data includes the SR TE configuration information, in one case, for example, S101 may be: The control and management device sends a Path Computation Element Communication Protocol (PCEP) packet to the terminal device, where the SR TE configuration information carried in the PCEP packet may include a corresponding SR label. In another case, for example, S101 may be: The control and management device sends a Network Configuration Protocol (NETCONF) packet or a Yet Another Next Generation (YANG) model packet to the terminal device, where the SR TE configuration information carried in the NETCONF packet or the YANG model packet may include a corresponding SR label. In this scenario, an SR label corresponding to the first data is similar to a Multi-Protocol Label Switching (MPLS) label in an MPLS TE scenario. Details are not described in this embodiment of this disclosure.

If the first data includes the SR TE-policy configuration information, in one case, for example, S101 may be: The control and management device statically delivers a command line to the terminal device, where the command line carries the SR TE-policy configuration information. In another case, for example, S101 may be: The control and management device sends a Border Gateway Protocol (BGP) packet to the terminal device, where the BGP packet may carry the SR TE-policy configuration information. The SR TE-policy configuration information may include a triplet identifier, at least one candidate path, a preference attribute of each candidate path, at least one weight of each candidate path, and a segment identification (SID) list corresponding to the weight. The triplet identifier uniquely identifies the SR TE-policy configuration information. For example, the triplet identifier may include a headend indicating a node for generating or implementing an SR TE-policy, a color used to distinguish between a plurality of SR TE-policies between a same headend and a same endpoint, and an endpoint indicating an endpoint of the SR Policy. The headend or the endpoint may be an Internet Protocol (IP) version 4 (IPv4) address or an IP version 6 (IPv6) address. The candidate path may be uniquely identified by a protocol-origin, an originator, and a discriminator. For example, specific forms of the SR TE-policy configuration information may be as follows:

SR policy POL1 <headend, color, endpoint>//Name and identifier of an SR policy of a POL1
Candidate-path CP1 <protocol-origin, originator, discriminator>//Candidate path CP1 of the SR policy
Preference 200 //Preference attribute of a candidate path corresponding to CP1 is 200
weight W1, SID-List1 <SID11 . . . SID1i>//SID List whose weight is W1
weight W2, SID-List2 <SID21 . . . SID2j>//SID List whose weight is W2
Candidate-path CP2 <protocol-origin, originator, discriminator>//Candidate path CP2 of the SR policy
Preference 100 //Preference attribute of a candidate path corresponding to CP2 is 100
weight W3, SID-List3 <SID31 . . . SID3i>//SID List whose weight is W3
weight W4, SID-List4 <SID41 . . . SID4j>//SID List whose weight is W4

Each SID list may include a plurality of corresponding SIDs, and each SID may be an SR label corresponding to one node.

If the first data includes the ACL configuration information, in one case, for example, S101 may be: The control and management device statically delivers a command line to the terminal device, where the command line carries the ACL configuration information. In another case, for example, S101 may be: The control and management device sends an NETCONF packet or a YANG model packet to the terminal device, where the NETCONF packet or the YANG model packet carries the ACL configuration information.

If the first data includes the FlowSpec configuration information, in one case, for example, S101 may be: The control and management device sends a BGP packet to the terminal device, where the BGP packet may carry the FlowSpec configuration information.

It should be noted that the foregoing four possible data types are merely examples for description. The first data in this embodiment of this disclosure may alternatively be another entry or other configuration information. This is not limited.

The control and management device may store the first data after S101. After S101, the terminal device may not only generate, based on the first data, an entry used to guide packet processing, but also store the first data. The entry that is on the terminal device and that is used to guide packet processing may match the locally stored first data. In addition, a sequence of storing the first data in the control and management device may be consistent with a sequence of storing the first data in the terminal device, to ensure that a verification result is not affected due to a sequence of storing the data when integrity verification is performed on the first data. For example, the first data may be sorted and stored in a lexicographical order, or may be sorted and stored based on a timestamp corresponding to the data.

It should be noted that, during integrity verification, it is required that verified objects on the terminal device and the control and management device are the same. In other words, data that is on the terminal device and that participates in the verification is the same as data that is on the control and management device and that participates in the verification. In an example, if the terminal device and the control and management device keep clock synchronization, a requirement for consistency of verified objects may be satisfied. In another example, if no clock synchronization function is set for the terminal device and the control and management device, the first data in S101 may further carry a sending timestamp. In this way, data with a same sending timestamp may be used as data that participates in the verification. Performing verification based on the integrity verification method provided in this embodiment of this disclosure may also satisfy a requirement for consistency of verified objects.

S102: The control and management device generates an integrity measurement baseline value corresponding to the first data, where the integrity measurement baseline value is used to perform the integrity verification on the first data.

S103: The control and management device sends the integrity measurement baseline value corresponding to the first data to the verification server.

The integrity measurement baseline value corresponding to the first data may be used as a reference value for the integrity verification performed by the verification server on the first data, and an integrity measurement value corresponding to the first data is matched with the integrity measurement baseline value. If the integrity measurement value matches the integrity measurement baseline value, it is determined that the integrity verification on the first data succeeds, otherwise, it is determined that the integrity verification on the first data fails. The integrity measurement baseline value corresponding to the first data may be, for example, a hash value obtained through hash calculation, a digital signature, or an encrypted value obtained through encryption processing.

In some possible implementations, S102 may be that the control and management device generates, based on the first data, an integrity measurement baseline value corresponding to the first data.

In an example, the control and management device may determine the integrity measurement baseline value corresponding to the first data based on all content of the first data. For example, the control and management device may perform hash calculation on all content of the locally stored first data to obtain a hash value, and use the obtained hash value as the integrity measurement baseline value corresponding to the first data. For another example, the control and management device may alternatively perform a digital signature operation on all content of the locally stored first data to obtain a signature, and use the obtained signature as the integrity measurement baseline value corresponding to the first data. For still another example, the control and management device may perform encryption processing on all content of the locally stored first data to obtain an encrypted value, and use the obtained encrypted value as the integrity measurement baseline value corresponding to the first data.

In another example, the control and management device may determine the integrity measurement baseline value corresponding to the first data based on partial content of the first data. The partial content of the first data may be data that participates in the verification and that is in the first data. For example, S102 may include: The control and management device determines the partial content of the first data from the first data according to a preset rule, to determine, based on the determined partial content of the first data, the integrity measurement baseline value corresponding to the first data. The preset rule may be flexibly set based on an actual requirement. For example, a corresponding weight may be set for each piece of content in the first data and a weight threshold may be set. In this case, the preset rule may include selecting content whose weight is not less than the weight threshold, and sorting the selected content in a locally stored order (or a weight order), to obtain the partial content of the first data. For another example, the preset rule may include selecting content of some preset locations, and sorting the selected content in a locally stored order (or a weight order), to obtain the partial content of the first data. In this example, implementations of S102 may include but are not limited to: Manner 1: The control and management device may perform hash calculation on partial content of the locally stored first data to obtain a hash value, and use the obtained hash value as the integrity measurement baseline value corresponding to the first data. Manner 2: The control and management device may alternatively perform a digital signature operation on partial content of the locally stored first data to obtain a signature, and use the obtained signature as the integrity measurement baseline value corresponding to the first data. For still another example, the control and management device may perform encryption processing on partial content of the locally stored first data to obtain an encrypted value, and use the obtained encrypted value as the integrity measurement baseline value corresponding to the first data.

In some possible implementations, S102 may be that the control and management device generates, based on a first operation log corresponding to sending of the first data, the integrity measurement baseline value corresponding to the first data. It should be noted that, to record an operation performed by the control and management device, the control and management device may record, in the first operation log, each behavior of sending data to the terminal device as one piece of content of the first operation log. If the first data is only a behavior of sending data to the terminal device once by the control and management device, the control and management device may determine, based on one piece of content that corresponds to sending of the first data and that is of the first operation log, the integrity measurement baseline value corresponding to the first data. If the first data includes a behavior of sending data to the terminal device for a plurality of times by the control and management device, the control and management device may determine, based on all of a plurality of pieces of content that correspond to sending of the first data and that are of the first operation log, the integrity measurement baseline value corresponding to the first data. Alternatively, the control and management device may determine, based on some of a plurality of pieces of content that correspond to sending of the first data and that are of the first operation log, the integrity measurement baseline value corresponding to the first data, where the some of the plurality of pieces of content may be, for example, content corresponding to an operation type in the plurality of pieces of content, and operation types may include addition, deletion, modification, and the like, or the some of the plurality of pieces of content may be, for example, content that is in the plurality of pieces of content and that corresponds to content that is generated at time intervals of preset duration. The integrity measurement baseline value may be, for example, a hash value obtained through hash calculation, a signature obtained by performing a digital signature operation, or an encrypted value obtained through encryption processing.

During specific implementation, for an occasion of performing S102, in one case, when the control and management device sends data to the terminal device in batches at an early stage of network deployment, the control and management device may perform, by performing the method 100, the integrity verification on the first data sent in batches. In another case, in a running process of the terminal device, when the control and management device needs to send data to the terminal device, the control and management device may perform, by performing the method 100, the integrity verification on the first data sent incrementally.

The data sent in batches may alternatively be referred to as basic data, and is data necessary for running of the terminal device. The data sent incrementally may be data sent after sending of the data sent in batches is completed and after preset duration (for example, one minute) is exceeded. It should be noted that, the control and management device may send the incremental data to the terminal device, for example, routing information of a remote device of the terminal device changes.

In this implementation, the first operation log may store an operation type and operation data. If the first data is the data sent in batches, the integrity measurement baseline value corresponding to the first data may be generated based on all or some content of the first data, or the integrity measurement baseline value corresponding to the first data may be generated based on the first operation log corresponding to sending of the first data. If the first data is the incremental data, that the integrity measurement baseline value corresponding to the first data is generated based on the first operation log corresponding to sending of the first data may be preferred.

After or when S102 is performed, the control and management device may further directly or indirectly send a first indication to the terminal device. The first indication indicates the terminal device to perform the integrity verification on the first data. The first indication may be used as a possible trigger condition for performing the following S104. The control and management device may indirectly send the first indication to the terminal device. For example, the control and management device may send the first indication to the terminal device via the verification server. The control and management device may carry the first indication in any packet and send the packet to the terminal device, provided that the packet is of a packet type that can be identified and processed by the terminal device.

For S103, the control and management device may carry the integrity measurement baseline value corresponding to the first data in any packet and send the packet to the verification server. For example, the control and management device may carry the integrity measurement baseline value corresponding to the first data in the BGP packet and send the BGP packet to the verification server. For another example, the control and management device may carry the integrity measurement baseline value corresponding to the first data in the PCEP packet and send the PCEP packet to the verification server. In this embodiment of this disclosure, a type of a packet carrying the integrity measurement baseline value of the first data is not limited, provided that the packet can be identified and processed by the verification server.

In an example, to complete the integrity verification more securely and reliably, the control and management device may further carry the integrity measurement baseline value of the first data in a certificate, and send the certificate to the verification server.

It should be noted that, after S102 and S103, a verification standard is provided for the subsequent integrity verification performed by the verification server on the first data, so that it is possible to complete a reliable, secure, and accurate integrity verification.

It should be noted that S101 to S103 may be separately used as a complete embodiment executed by the control and management device. The method 100 is merely described as a whole from the perspective of interaction between the terminal device, the control and management device, and the verification server for ease of description.

S104: The terminal device generates the integrity measurement value corresponding to the first data, where the integrity measurement value is used to perform the integrity verification on the first data.

S105: The terminal device sends the integrity measurement value corresponding to the first data to the verification server.

The integrity measurement value corresponding to the first data may be used as a to-be-verified value participating in the integrity verification. The integrity measurement value corresponding to the first data is matched with the integrity measurement baseline value corresponding to the first data. If the integrity measurement value matches the integrity measurement baseline value, it is determined that the integrity verification on the integrity measurement value of the first data succeeds, in other words, the integrity verification on the first data succeeds, otherwise, it is determined that the integrity verification on the integrity measurement value of the first data fails, in other words, the integrity verification on the first data fails. The integrity measurement value corresponding to the first data may be, for example, a hash value obtained through hash calculation, a digital signature, or an encrypted value obtained through encryption processing.

In some possible implementations, if in S102, the control and management device generates, based on the first data, the integrity measurement baseline value corresponding to the first data, in S104, the terminal device may generate, based on the first data, the integrity measurement value corresponding to the first data.

In an example, if in S102, the control and management device determines, based on all the content of the first data, the integrity measurement baseline value corresponding to the first data, in S104, the terminal device may alternatively determine, based on all the content of the first data, the integrity measurement value corresponding to the first data. For example, the terminal device may perform hash calculation on all content of the locally stored first data to obtain a hash value, and use the obtained hash value as the integrity measurement value corresponding to the first data. For another example, the terminal device may alternatively perform a digital signature operation on all content of the locally stored first data to obtain a signature, and use the obtained signature as the integrity measurement value corresponding to the first data. For still another example, the terminal device may perform encryption processing on all content of the locally stored first data to obtain an encrypted value, and use the obtained encrypted value as the integrity measurement value corresponding to the first data.

In another example, if in S102, the control and management device determines, based on the partial content of the first data, the integrity measurement baseline value corresponding to the first data, in S104, the terminal device may alternatively determine, based on the partial content of the first data, the integrity measurement value corresponding to the first data. The partial content of the first data may be data that participates in the verification and that is in the first data. For example, S104 may include: The terminal device determines the partial content of the first data from the first data according to a preset rule, to determine, based on the determined partial content of the first data, the integrity measurement value corresponding to the first data. The preset rule may be consistent with the preset rule that is followed when the partial content of the first data is selected in S102. In this example, an implementation of S104 may include but is not limited to: Manner 1: The terminal device may perform hash calculation on partial content of the locally stored first data to obtain a hash value, and use the obtained hash value as the integrity measurement value corresponding to the first data. Manner 2: The terminal device may alternatively perform a digital signature operation on partial content of the locally stored first data to obtain a signature, and use the obtained signature as the integrity measurement value corresponding to the first data. For still another example, the terminal device may perform encryption processing on partial content of the locally stored first data to obtain an encrypted value, and use the obtained encrypted value as the integrity measurement value corresponding to the first data.

In some possible implementations, if in S102, the control and management device generates, based on the first operation log corresponding to sending of the first data, the integrity measurement baseline value corresponding to the first data, in S104, the terminal device may generate, based on a second operation log corresponding to receiving of the first data, the integrity measurement value corresponding to the first data. It should be noted that, to record an operation performed by the terminal device, the terminal device may record, in the second operation log, each behavior of receiving data from the control and management device as one piece of content of the second operation log. If the first data is only a behavior of receiving data from the control and management device once by the terminal device, the terminal device may determine, based on one piece of content that corresponds to receiving of the first data and that is of the second operation log, the integrity measurement value corresponding to the first data. If the first data includes a behavior of receiving data from the control and management device for a plurality of times by the terminal device, the terminal device may determine, based on all of a plurality of pieces of content that correspond to sending of the first data and that is of the second operation log, the integrity measurement value corresponding to the first data. Alternatively, the terminal device may determine, based on some of a plurality of pieces of content that correspond to sending of the first data and that is of the second operation log, the integrity measurement value corresponding to the first data, where a rule of selecting the some of the plurality of pieces of content may be consistent with a selection rule of selecting the some of the plurality of pieces of content from the first operation log by the control and management device. The integrity measurement value may be, for example, a hash value obtained through hash calculation, a signature obtained by performing a digital signature operation, or an encrypted value obtained through encryption processing.

In this implementation, the second operation log may store an operation type and operation data. If the first data is the data sent in batches, the integrity measurement value corresponding to the first data may be generated based on all or some content of the first data, or the integrity measurement value corresponding to the first data may be generated based on the second operation log corresponding to receiving of the first data. If the first data is the incremental data, that the integrity measurement value corresponding to the first data is generated based on the second operation log corresponding to receiving of the first data may be preferred.

It should be noted that a manner of generating the integrity measurement value in S104 needs to correspond to a manner of generating the integrity measurement baseline value in S102. For example, in S102, the control and management device performs hash calculation on all the content of the locally stored first data to obtain the hash value, and uses the obtained hash value as the integrity measurement baseline value corresponding to the first data.

In this case, in S104, the terminal device performs hash calculation on all the content of the locally stored first data to obtain the hash value, and uses the obtained hash value as the integrity measurement value corresponding to the first data. In this way, it is possible for the verification server to accurately complete the integrity verification subsequently based on a corresponding manner. If a manner in which the terminal device generates the integrity measurement value does not correspond to a manner in which the control and management device generates the integrity measurement baseline value, for example, in S102, the control and management device performs hash calculation on all the content of the locally stored first data to obtain the hash value, and uses the obtained hash value as the integrity measurement baseline value corresponding to the first data, however, in S104, the terminal device performs a digital signature operation on the second operation log corresponding to receiving of the first data to obtain the signature, and uses the obtained signature as the integrity measurement value corresponding to the first data. In this case, the verification server is likely to fail to complete the integrity verification on the first data.

In specific implementation, for an occasion of performing S104, in one case, when the terminal device receives the first indication indicating to perform the integrity verification on the first data, the terminal device may be triggered to perform S104. The first indication may be directly sent by the control and management device to the terminal device. Alternatively, the first indication may be indirectly sent by the control and management device to the terminal device via verification server. Alternatively, the first indication may be generated and sent to the terminal device when the verification server receives a verification request sent by the control and management device or the integrity measurement baseline value corresponding to the first data. In another case, when the terminal device determines that a preset condition is satisfied, the terminal device may be triggered to perform S104. The preset condition may be a condition that is agreed upon by the control and management device and the terminal device to perform the integrity verification by performing the method 100.

The preset condition may be, for example, that a total length of the received first data reaches a preset length threshold. For example, the terminal device records, starting from receiving a first piece of data sent by the control and management device (or starting from a moment), a total length of data received from the control and management device. If the total length is equal to the preset length threshold, it is determined that the preset condition is satisfied, and S104 is triggered. Similarly, the control and management device records, starting from sending a first piece of data to the terminal device (or starting from a moment), a total length of data sent to the terminal device. If the total length is equal to the preset length threshold, it is determined that the preset condition is satisfied, and S102 is triggered. In this case, the total length of the first data may be the preset length threshold. Alternatively, the preset condition may be, for example, that a quantity of entries included in the received first data reaches a preset quantity threshold. For example, the terminal device records, starting from receiving a first piece of data sent by the control and management device (or starting from a moment), a total quantity of entries included in data received from the control and management device. If the total quantity is equal to the preset quantity threshold, it is determined that the preset condition is satisfied, and S104 is triggered. Similarly, the control and management device records, starting from sending a first piece of data to the terminal device (or starting from a moment), a total quantity of entries included in data sent to the terminal device. If the total quantity is equal to the preset quantity threshold, it is determined that the preset condition is satisfied, and S102 is triggered. In this case, the total quantity of entries included in the first data may be the preset quantity threshold. Alternatively, the preset condition may be, for example, that accumulated duration of receiving the first data reaches preset duration. For example, the terminal device records, starting from receiving a first piece of data sent by the control and management device (or starting from a moment), accumulated duration of receiving data from the control and management device. If the accumulated duration is equal to the preset duration, it is determined that the preset condition is satisfied, and S104 is triggered. Similarly, the control and management device records, starting from sending a first piece of data to the terminal device (or starting from a moment), accumulated duration of sending data to the terminal device. If the accumulated duration is equal to the preset duration, it is determined that the preset condition is satisfied, and S102 is triggered. In this case, the first data may be all data sent by the control and management device to the terminal device within the preset duration. Alternatively, the preset condition may be, for example, that the received first data whose attribute is incremental data. For example, if data sent by the control and management device is not received within preset duration before the first data starts to be received, it is considered that the first data is the incremental data. In this case, it is determined that the preset condition is satisfied, and S104 is triggered. Similarly, the control and management device sends the first data whose attribute is incremental data. For example, if no data is sent to the terminal device within preset duration before the first data starts to be sent, it is considered that the first data is the incremental data. In this case, it is determined that the preset condition is satisfied, and S102 is triggered.

For S105, the terminal device may carry the integrity measurement value corresponding to the first data in any packet and send the packet to the verification server. For example, the terminal device may carry the integrity measurement value corresponding to the first data in the BGP packet and send the BGP packet to the verification server. For another example, the terminal device may carry the integrity measurement value corresponding to the first data in the PCEP packet and send the PCEP packet to the verification server. In this embodiment of this disclosure, a type of a packet carrying the integrity measurement value of the first data is not limited, provided that the packet can be identified and processed by the verification server.

In an example, to complete the integrity verification more securely and reliably, the terminal device may further carry the integrity measurement value of the first data in a certificate, and send the certificate to the verification server.

It should be noted that, after S104 and S105, a verified object is provided for the subsequent integrity verification performed by the verification server on the first data, so that it is possible to complete a reliable, secure, and accurate integrity verification.

It should be noted that S101, S104, and S105 may be separately used as a complete embodiment executed by the terminal device. The method 100 is merely described as a whole from the perspective of interaction between the terminal device, the control and management device, and the verification server for ease of description.

S106: The verification server performs the integrity verification on the first data based on the integrity measurement value and the integrity measurement baseline value.

In specific implementation, for example, S106 may include: If the verification server determines that the integrity measurement value matches the integrity measurement baseline value, the verification server determines that the integrity verification on the first data succeeds. On the contrary, if the verification server determines that the integrity measurement value does not match the integrity measurement baseline value, the verification server determines that the integrity verification on the first data fails.

For example, the integrity measurement baseline value of the first data is a first hash value obtained by performing calculation on all content of the first data (or partial content of the first data, or a first operation log corresponding to sending of the first data) by using a first hash algorithm, and the integrity measurement value of the first data is a second hash value obtained by performing calculation on all the content of the first data (or the partial content of the first data, or a second operation log corresponding to receiving of the first data) by using the first hash algorithm. In this case, in S106, for example, the verification server may determine whether the first hash value is consistent with the second hash value. If the first hash value is consistent with the second hash value, the verification server determines that the integrity verification on the first data succeeds, otherwise, the verification server determines that the integrity verification on the first data fails.

For another example, the integrity measurement baseline value of the first data is a first signature obtained, based on all content of the first data (or partial content of the first data, or a first operation log corresponding to sending of the first data), by performing a signature operation on a first hash value by using a first private key, and the integrity measurement value of the first data is a second signature obtained by performing a signature operation on a second hash value on all the content of the first data (or the partial content of the first data, or a second operation log corresponding to receiving of the first data) by using a second private key. In one case, in S106, the verification server may first determine whether a first public key corresponding to the first private key is the same as a second public key corresponding to the second private key. If the first public key is the same as the second public key, the verification server determines whether the first signature is consistent with the second signature. If the first signature is consistent with the second signature, the verification server determines that the integrity verification on the first data succeeds, otherwise, the verification server determines that the integrity verification on the first data fails. In another case, in S106, the verification server may first process the first signature by using a first public key corresponding to the first private key, to obtain the first hash value, process the second signature by using a second public key corresponding to the second private key, to obtain the second hash value, and then determine whether the first hash value is consistent with the second hash value. If the first hash value is consistent with the second hash value, the verification server determines that the integrity verification on the first data succeeds, otherwise, the verification server determines that the integrity verification on the first data fails. The first public key may be a public key corresponding to a first private key corresponding to the control and management device, and the public key may be locally stored in the verification server in advance, or may be sent by the control and management device to the verification server when the control and management device sends the integrity measurement baseline value of the first data to the verification server. Similarly, the second public key may be a public key corresponding to a second private key corresponding to the terminal device, and the public key may be locally stored in the verification server in advance, or may be sent by the terminal device to the verification server when the terminal device sends the integrity measurement value of the first data to the verification server.

For still another example, the integrity measurement baseline value of the first data is a first encrypted value obtained by performing calculation on all content of the first data (or partial content of the first data, or a first operation log corresponding to sending of the first data) by using a first encryption algorithm, and the integrity measurement value of the first data is a second encrypted value obtained by performing calculation on all the content of the first data (or the partial content of the first data, or a second operation log corresponding to receiving of the first data) by using the first encryption algorithm. In one case, in S106, for example, the verification server may determine whether the first encrypted value is consistent with the second encrypted value. If the first encrypted value is consistent with the second encrypted value, the verification server determines that the integrity verification on the first data succeeds, otherwise, the verification server determines that the integrity verification on the first data fails. In another case, in S106, for example, the verification server may first decrypt the first encrypted value by using a first decryption algorithm corresponding to the first encryption algorithm, to obtain a first decrypted value, decrypt the second encrypted value by using the first decryption algorithm corresponding to the first encryption algorithm, to obtain a second decrypted value, and then determine whether the first decrypted value is consistent with the second decrypted value. If the first decrypted value is consistent with the second decrypted value, the verification server determines that the integrity verification on the first data succeeds, otherwise, the verification server determines that the integrity verification on the first data fails.

When the integrity verification on the first data fails, to enable the control and management device to sense a problem of consistency of the first data between the control and management device and the terminal device, the verification server may send an alarm message to the control and management device, to notify the control and management device that the first data on the terminal device is abnormal. After receiving the alarm message, to ensure that the terminal device can continue to run normally, the control and management device may further send the first data to the terminal device again, to indicate the terminal device to replace the locally stored first data with newly received first data, or indicate the terminal device to store newly received first data and add an aging flag to previously stored first data. The first data to which the aging flag is added cannot be used to guide the terminal device to process a packet, but the newly received first data is used to guide the terminal device to process the packet.

It should be noted that, for data sent in batches, to ensure a secure and accurate verification, the integrity verification may be performed periodically. For data sent incrementally, the integrity verification may be performed on incremental data in real time.

It should be noted that the verification server receives the integrity measurement baseline value that is of the first data and that is sent by the control and management device in S103, the verification server receives the integrity measurement value that is of the first data and that is sent by the terminal device in S105, and S106 may be separately used as a complete embodiment performed by the verification server. The method 100 is merely described as a whole from the perspective of interaction between the terminal device, the control and management device, and the verification server for ease of description.

It can be learned that, according to the method 100 provided in this embodiment of this disclosure, the trusted verification server performs the integrity verification on the integrity measurement value and the integrity measurement baseline value that correspond to the first data respectively sent by the terminal device and the control and management device. Only the integrity measurement value and the integrity measurement baseline value that correspond to the first data need to be exchanged, and no full first data needs to be exchanged. This effectively reduces an amount of data that needs to be exchanged during verification, and greatly saves resources occupied in a verification process. In addition, the trusted verification server is introduced, instead of directly comparing full data of the first data by the control and management device, the verification server may complete the integrity verification on the first data based on the integrity measurement value and the integrity measurement baseline value that correspond to the first data. This can ensure that the verification process is more secure and reliable, and ensures normal running of a service on the terminal device.

The foregoing method 100 is described by using an example in which the trusted verification server performs the integrity verification on the first data sent by the control and management device to the terminal device. The method provided in this embodiment of this disclosure may be further used to perform integrity verification on second data sent by the terminal device to the control and management device, or perform integrity verification on third data exchanged between terminal devices. For a procedure of the integrity verification, refer to related descriptions in the foregoing method 100.

Figure 3:
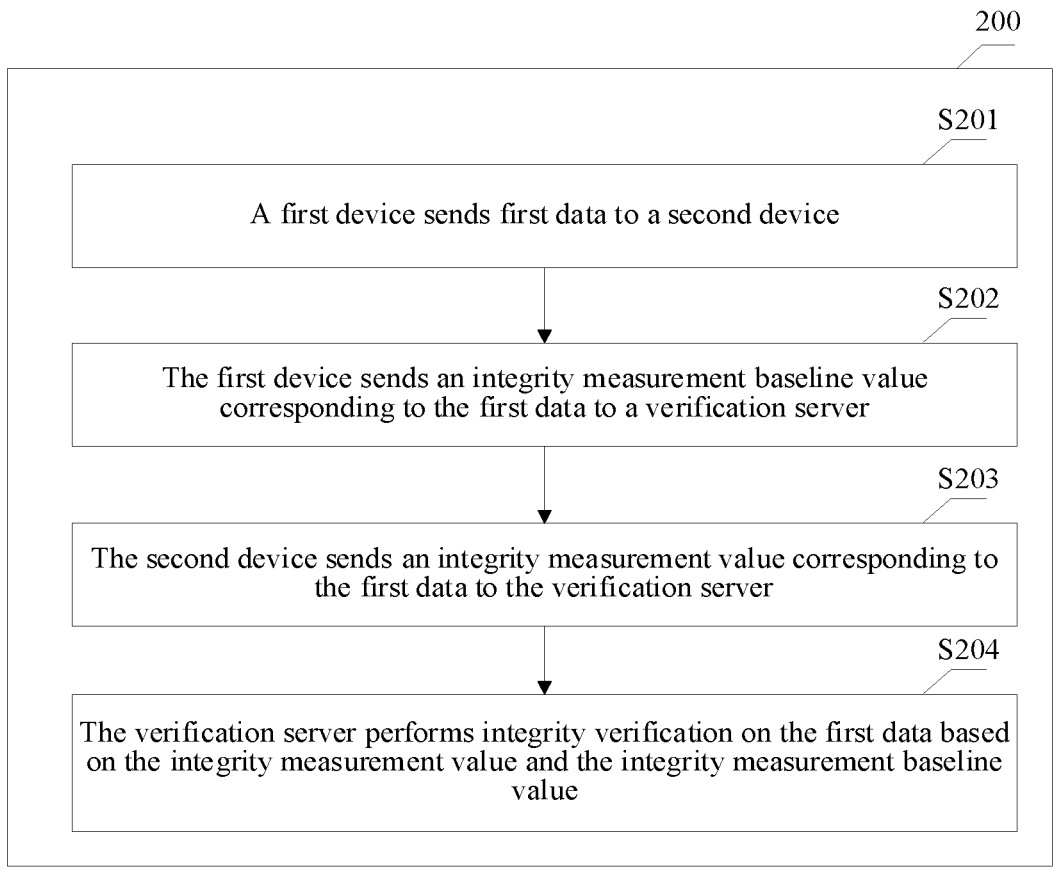
FIG. 3 is a schematic flowchart of an integrity verification method according to an embodiment of this disclosure.

An embodiment of this disclosure provides an integrity verification method 200. As shown in FIG. 3, the method 200 describes integrity verification on first data in an interactive manner. For example, the method 200 may include the following steps.

S201: A first device sends first data to a second device.

S202: The first device sends an integrity measurement baseline value corresponding to the first data to a verification server.

S203: The second device sends an integrity measurement value corresponding to the first data to the verification server.

S204: The verification server performs the integrity verification on the first data based on the integrity measurement value and the integrity measurement baseline value.

In the method 200, the first device may be a control and management device, and the second device may be a terminal device. Alternatively, the first device may be a terminal device, and the second device may be a control and management device. Alternatively, both the first device and the second device may be terminal devices.

For example, in the method 200, the first device is a control and management device and the second device is a terminal device. In this case, the first device in the method 200 may be the control and management device in the method 100. For specific related operations, refer to operations performed by the control and management device in the method 100. The second device in the method 200 may be the terminal device in the method 100. For specific related operations, refer to operations performed by the terminal device in the method 100. The verification server in the method 200 may be the verification server in the method 100. For specific related operations, refer to operations performed by the verification server in the method 100. Further, for related descriptions of S201, refer to S101 in the method 100. For related descriptions of S202, refer to S103 in the method 100. For related descriptions of S203, refer to S105 in the method 100. For related descriptions of S204, refer to S106 in the method 100. The first data may be the first data in the method 100. The integrity measurement value corresponding to the first data may be the integrity measurement value corresponding to the first data in the method 100. The integrity measurement baseline value corresponding to the first data may be the integrity measurement baseline value corresponding to the first data in the method 100.

In an example, the first data may include at least one of the following: SR TE configuration information, SR TE-policy configuration information, ACL configuration information, or FlowSpec configuration information.

The integrity measurement baseline value may be a hash value obtained through hash calculation, and the integrity measurement value is a hash value obtained through hash calculation. Alternatively, the integrity measurement baseline value may be a digital signature, and the integrity measurement value is a digital signature. Alternatively, the integrity measurement baseline value may be an encrypted value obtained through encryption processing, and the integrity measurement value is an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data. For example, data to be verified by the first device is data a and data b, and data to be verified by the second device is also data a and data b.

In a possible implementation, before the first device sends the integrity measurement baseline value of the first data to the verification server, the first device may further calculate the integrity measurement baseline value corresponding to the first data, and before the second device sends the integrity measurement value of the first data to the verification server, the second device may further calculate the integrity measurement value corresponding to the first data.

For example, in the method 200, the first device is a control and management device and the second device is a terminal device. For calculating the integrity measurement baseline value corresponding to the first data by the first device, refer to related descriptions of S102 in the method 100. For calculating the integrity measurement value corresponding to the first data by the second device, refer to related descriptions of S104 in the method 100.

In an example, that the first device calculates the integrity measurement baseline value corresponding to the first data may include the following. The first device determines the integrity measurement baseline value based on all content of the first data. That the second device calculates the integrity measurement value corresponding to the first data may include the following. The second device determines the integrity measurement value based on all the content of the first data. The first device and the second device store the first data in a same sequence, to ensure that verification values calculated based on all the content of the first data are in correspondence. This ensures accurate execution of the integrity verification.

In another example, that the first device calculates the integrity measurement baseline value corresponding to the first data may include the following. The first device determines the integrity measurement baseline value based on partial content of the first data. That the second device calculates the integrity measurement value corresponding to the first data may include the following. The second device determines the integrity measurement value based on the partial content of the first data. Rules for obtaining the partial content of the first data on the first device and the second device are the same. This ensures that verification values calculated based on the partial content of the first data are in correspondence, and ensures accurate execution of the integrity verification.

In still another example, that the first device calculates the integrity measurement baseline value corresponding to the first data may include the following. The first device determines the integrity measurement baseline value based on a first operation log corresponding to sending of the first data. That the second device calculates the integrity measurement value corresponding to the first data may include the following. The second device determines the integrity measurement value based on a second operation log corresponding to receiving of the first data. Rules for generating operation logs for data sending and receiving on the first device and the second device may be the same. This ensures that verification values obtained based on the first operation log corresponding to the first data and the second operation log corresponding to the first data are in correspondence, and ensures accurate execution of the integrity verification.

In a possible implementation, that the second device sends the integrity measurement value corresponding to the first data to the verification server may be triggered based on a received first indication, or may be triggered after a local preset condition is satisfied.

In an example, before the second device sends the integrity measurement value corresponding to the first data to the verification server, the second device may further receive the first indication, where the first indication indicates the second device to perform the integrity verification on the first data. The first indication may be sent by the first device to the second device, or the first indication may be sent by the verification server to the second device.

In another example, before the second device sends the integrity measurement value corresponding to the first data to the verification server, the second device may further generate the integrity measurement value when determining that the preset condition is satisfied. The preset condition includes at least one of the following: Condition 1: a total length of the received first data reaches a preset length threshold, Condition 2: a quantity of entries included in the received first data reaches a preset quantity threshold, Condition 3: accumulated duration of receiving the first data reaches preset duration, or Condition 4: the first data is incremental data. In this way, the second device may be triggered to calculate the integrity measurement value corresponding to the first data and send the integrity measurement value to the verification server, so that the verification server verifies integrity of the first data.

It should be noted that, in the method 200, for related descriptions and achieved effects of the first device, refer to related operations performed by the control and management device and corresponding effect descriptions in the method 100. For related descriptions and achieved effects of the second device, refer to related operations performed by the terminal device and corresponding effect descriptions in the method 100. For related descriptions and achieved effects of the verification server, refer to related operations performed by the verification server and corresponding effect descriptions in the method 100.

Figure 4:
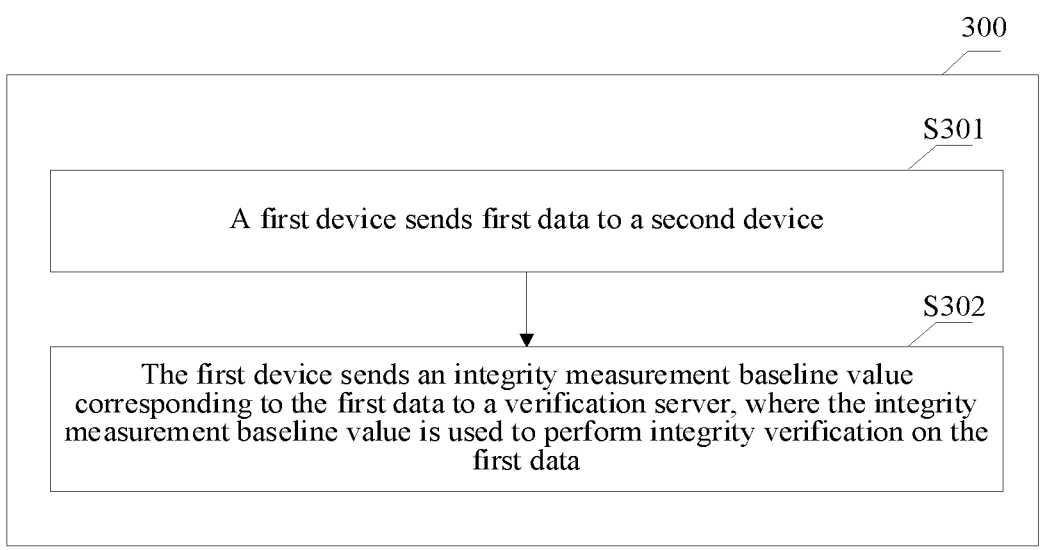
FIG. 4 is a schematic flowchart of an integrity verification method according to an embodiment of this disclosure.

An embodiment of this disclosure further provides an integrity verification method 300. Refer to FIG. 4. The method 300 is applied to a first device. For example, the method 300 may include the following steps.

S301: The first device sends first data to a second device.

S302: The first device sends an integrity measurement baseline value corresponding to the first data to a verification server, where the integrity measurement baseline value is used to perform integrity verification on the first data.

In the method 300, the first device may be a control and management device, and the second device may be a terminal device. Alternatively, the first device may be a terminal device, and the second device may be a control and management device. Alternatively, both the first device and the second device may be terminal devices.

For example, in the method 300, the first device is a control and management device and the second device is a terminal device. In this case, the first device in the method 300 may be the control and management device in the method 100. For specific related operations, refer to operations performed by the control and management device in the method 100. Further, for related descriptions of S301, refer to S101 in the method 100. For related descriptions of S302, refer to S103 in the method 100. The first data may be the first data in the method 100. The integrity measurement baseline value corresponding to the first data may be the integrity measurement baseline value corresponding to the first data in the method 100.

In an example, the first data may include at least one of the following: SR TE configuration information, SR TE-policy configuration information, ACL configuration information, or FlowSpec configuration information.

The integrity measurement baseline value may be a hash value obtained through hash calculation, or the integrity measurement baseline value may be a digital signature, or the integrity measurement baseline value may be an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, before the first device sends the integrity measurement baseline value of the first data to the verification server, the first device may further calculate the integrity measurement baseline value corresponding to the first data.

For example, in the method 300, the first device is a control and management device and the second device is a terminal device. For calculating the integrity measurement baseline value corresponding to the first data by the first device, refer to related descriptions of S102 in the method 100.

In an example, that the first device calculates the integrity measurement baseline value corresponding to the first data may include the following. The first device determines the integrity measurement baseline value based on all content of the first data.

In another example, that the first device calculates the integrity measurement baseline value corresponding to the first data may include the following. The first device determines the integrity measurement baseline value based on partial content of the first data.

In still another example, that the first device calculates the integrity measurement baseline value corresponding to the first data may include the following. The first device determines the integrity measurement baseline value based on a first operation log corresponding to sending of the first data.

In a possible implementation, the first device may send a first indication to the second device, where the first indication indicates the second device to perform the integrity verification on the first data. The first indication may be directly sent by the first device to the second device, or the first indication may be sent by the first device to the second device via the verification server.

It should be noted that, for related descriptions and achieved effects of the first device in the method 300, refer to related operations performed by the control and management device and corresponding effect descriptions in the method 100.

Figure 5:
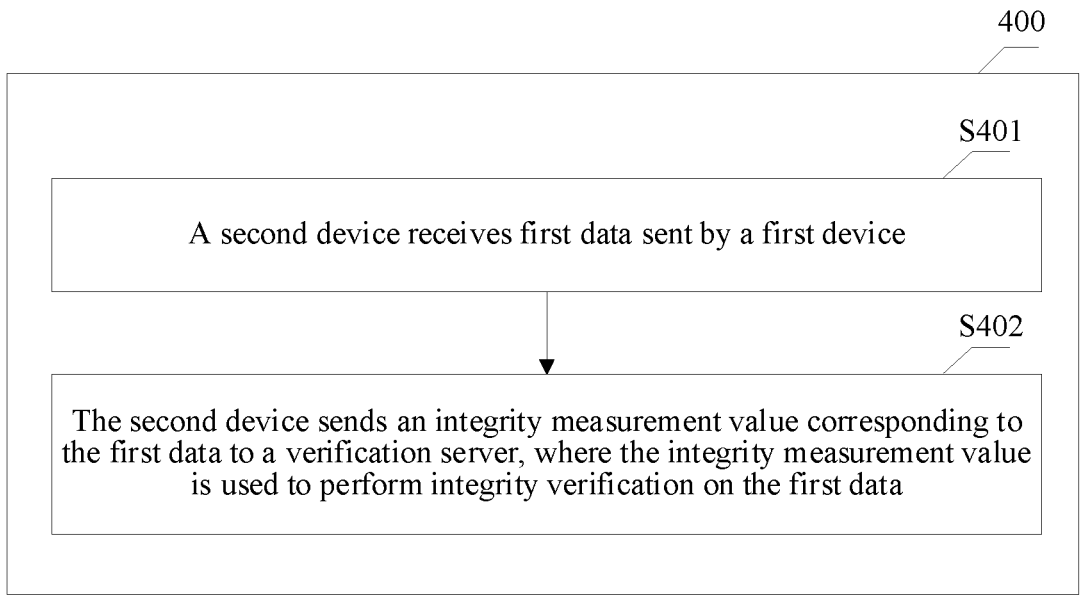
FIG. 5 is a schematic flowchart of an integrity verification method according to an embodiment of this disclosure.

An embodiment of this disclosure further provides an integrity verification method 400. Refer to FIG. 5. The method 400 is applied to a second device. For example, the method 400 may include the following steps.

S401: The second device receives first data sent by a first device.

S402: The second device sends an integrity measurement value corresponding to the first data to a verification server, where the integrity measurement value is used to perform integrity verification on the first data.

In the method 400, the first device may be a control and management device, and the second device may be a terminal device. Alternatively, the first device may be a terminal device, and the second device may be a control and management device. Alternatively, both the first device and the second device may be terminal devices.

For example, in the method 400, the first device is a control and management device and the second device is a terminal device. In this case, the second device in the method 400 may be the terminal device in the method 100. For specific related operations, refer to operations performed by the terminal device in the method 100. Further, for related descriptions of S401, refer to S101 in the method 100. For related descriptions of S402, refer to S105 in the method 100. The first data may be the first data in the method 100. The integrity measurement value corresponding to the first data may be the integrity measurement value corresponding to the first data in the method 100. The integrity measurement baseline value corresponding to the first data may be the integrity measurement baseline value corresponding to the first data in the method 100.

In an example, the first data may include at least one of the following: SR TE configuration information, SR TE-policy configuration information, ACL configuration information, or FlowSpec configuration information.

The integrity measurement value may be a hash value obtained through hash calculation, or the integrity measurement value may be a digital signature, or the integrity measurement value may be an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, before the second device sends the integrity measurement value of the first data to the verification server, the second device may further calculate the integrity measurement value corresponding to the first data.

For example, in the method 400, the first device is a control and management device and the second device is a terminal device. For calculating the integrity measurement value corresponding to the first data by the second device, refer to related descriptions of S104 in the method 100.

In an example, that the second device calculates the integrity measurement value corresponding to the first data may include the following. The second device determines the integrity measurement value based on all content of the first data.

In another example, that the second device calculates the integrity measurement value corresponding to the first data may include the following. The second device determines the integrity measurement value based on partial content of the first data.

In still another example, that the second device calculates the integrity measurement value corresponding to the first data may include the following. The second device determines the integrity measurement value based on a second operation log corresponding to receiving of the first data.

In a possible implementation, that the second device sends the integrity measurement value corresponding to the first data to the verification server may be triggered based on a received first indication, or may be triggered after a local preset condition is satisfied.

In an example, before the second device sends the integrity measurement value corresponding to the first data to the verification server, the second device may further receive the first indication, where the first indication indicates the second device to perform the integrity verification on the first data. The first indication may be sent by the first device to the second device, or the first indication may be sent by the verification server to the second device.

In another example, before the second device sends the integrity measurement value corresponding to the first data to the verification server, the second device may further generate the integrity measurement value when determining that the preset condition is satisfied. The preset condition includes at least one of the following: Condition 1: a total length of the received first data reaches a preset length threshold, Condition 2: a quantity of entries included in the received first data reaches a preset quantity threshold, Condition 3: accumulated duration of receiving the first data reaches preset duration, or Condition 4: the first data is incremental data. In this way, the second device may be triggered to calculate the integrity measurement value corresponding to the first data and send the integrity measurement value to the verification server, so that the verification server verifies integrity of the first data.

It should be noted that, for related descriptions and achieved effects of the second device in the method 400, refer to related operations performed by the terminal device and corresponding effect descriptions in the method 100.

Figure 6:
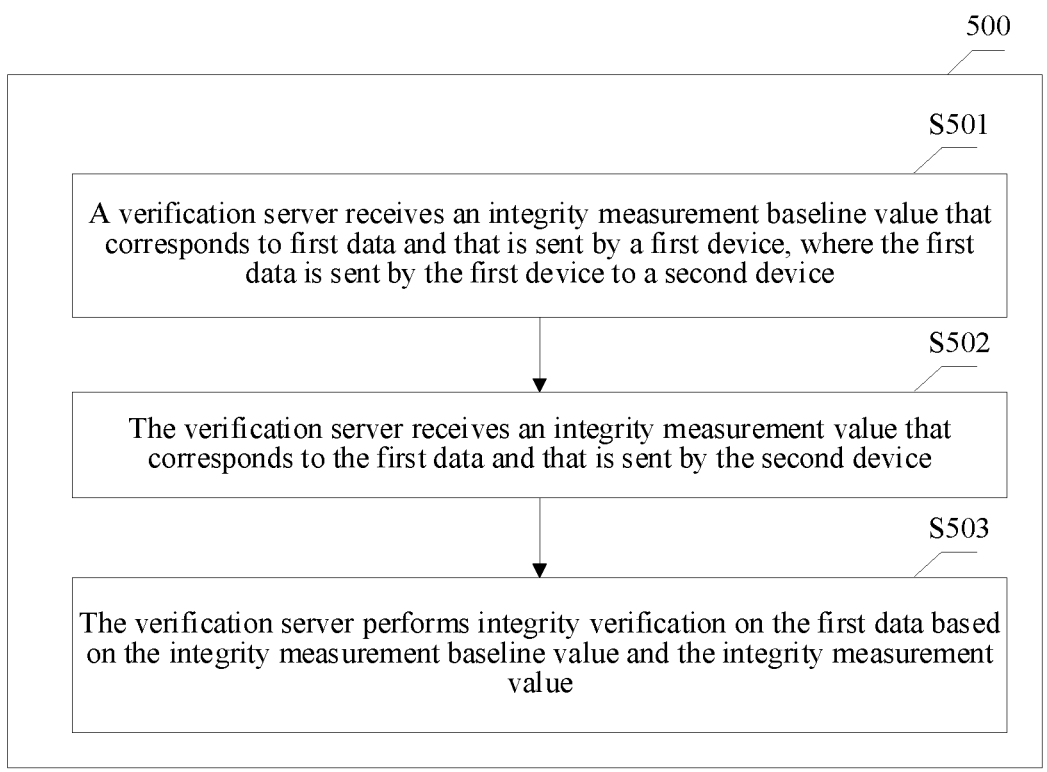
FIG. 6 is a schematic flowchart of an integrity verification method according to an embodiment of this disclosure.

An embodiment of this disclosure further provides an integrity verification method 500. Refer to FIG. 6. The method 500 is applied to a verification server. For example, the method 500 may include the following steps.

S501: The verification server receives an integrity measurement baseline value that corresponds to first data and that is sent by a first device, where the first data is sent by the first device to a second device.

S502: The verification server receives an integrity measurement value that corresponds to the first data and that is sent by the second device.

S503: The verification server performs integrity verification on the first data based on the integrity measurement baseline value and the integrity measurement value.

In the method 500, the first device may be a control and management device, and the second device may be a terminal device. Alternatively, the first device may be a terminal device, and the second device may be a control and management device. Alternatively, both the first device and the second device may be terminal devices.

For example, in the method 500, the first device is a control and management device and the second device is a terminal device. In this case, the verification server in the method 500 may be the verification server in the method 100. For specific related operations, refer to operations performed by the verification server in the method 100. Further, for related descriptions of S501, refer to S103 in the method 100. For related descriptions of S502, refer to S105 in the method 100. For related descriptions of S503, refer to S106 in the method 100. The first data may be the first data in the method 100. The integrity measurement value corresponding to the first data may be the integrity measurement value corresponding to the first data in the method 100. The integrity measurement baseline value corresponding to the first data may be the integrity measurement baseline value corresponding to the first data in the method 100.

In an example, the first data may include at least one of the following: SR TE configuration information, SR TE-policy configuration information, ACL configuration information, or FlowSpec configuration information.

The integrity measurement baseline value may be a hash value obtained through hash calculation, and the integrity measurement value is a hash value obtained through hash calculation. Alternatively, the integrity measurement baseline value may be a digital signature, and the integrity measurement value is a digital signature. Alternatively, the integrity measurement baseline value may be an encrypted value obtained through encryption processing, and the integrity measurement value is an encrypted value obtained through encryption processing.

It should be noted that, to ensure that the first device and the second device perform integrity verification on a same object, the first device and the second device may keep clock synchronization, or carry a sending timestamp in the first data. In this way, it can be ensured that the first data on which the integrity verification is performed is same data.

In a possible implementation, that the second device sends the integrity measurement value corresponding to the first data to the verification server may be triggered based on a received indication. In an example, the verification server may receive a first indication sent by the first device, where the first indication indicates the verification server to perform the integrity verification on the first data. In response to the first indication, the verification server may further send a second indication to the second device, where the second indication indicates to perform the integrity verification on the first data. In this way, the second device may calculate, based on the second indication, the integrity measurement value corresponding to the first data and send the integrity measurement value to the verification server.

In some possible implementations, that the verification server performs the integrity verification on the first data based on the integrity measurement baseline value and the integrity measurement value may include the following. The verification server determines that the integrity measurement value matches the integrity measurement baseline value, so that the verification server determines that the integrity verification on the first data succeeds.

In an example, the integrity measurement baseline value of the first data is a first hash value obtained by performing calculation on all content of the first data (or partial content of the first data, or a first operation log corresponding to sending of the first data) by using a first hash algorithm, and the integrity measurement value of the first data is a second hash value obtained by performing calculation on all the content of the first data (or the partial content of the first data, or a second operation log corresponding to receiving of the first data) by using the first hash algorithm. In this case, the verification server may determine whether the first hash value is consistent with the second hash value. If the first hash value is consistent with the second hash value, the verification server determines that the integrity verification on the first data succeeds, otherwise, the verification server determines that the integrity verification on the first data fails.

In another example, the integrity measurement baseline value of the first data is a first signature obtained, based on all content of the first data (or partial content of the first data, or a first operation log corresponding to sending of the first data), by performing a signature operation on a first hash value by using a first private key, and the integrity measurement value of the first data is a second signature obtained by performing a signature operation on a second hash value on all the content of the first data (or the partial content of the first data, or a second operation log corresponding to receiving of the first data) by using a second private key. In one case, the verification server may first determine whether a first public key corresponding to the first private key is the same as a second public key corresponding to the second private key. If the first public key is the same as the second public key, the verification server determines whether the first signature is consistent with the second signature. If the first signature is consistent with the second signature, the verification server determines that the integrity verification on the first data succeeds, otherwise, the verification server determines that the integrity verification on the first data fails. In another case, the verification server may first process the first signature by using a first public key corresponding to the first private key, to obtain the first hash value, process the second signature by using a second public key corresponding to the second private key, to obtain the second hash value, and then determine whether the first hash value is consistent with the second hash value. If the first hash value is consistent with the second hash value, the verification server determines that the integrity verification on the first data succeeds, otherwise, the verification server determines that the integrity verification on the first data fails. The first public key may be a public key corresponding to a first private key corresponding to the control and management device, and the public key may be locally stored in the verification server in advance, or may be sent by the control and management device to the verification server when the control and management device sends the integrity measurement baseline value of the first data to the verification server. Similarly, the second public key may be a public key corresponding to a second private key corresponding to the terminal device, and the public key may be locally stored in the verification server in advance, or may be sent by the terminal device to the verification server when the terminal device sends the integrity measurement value of the first data to the verification server.

In still another example, the integrity measurement baseline value of the first data is a first encrypted value obtained by performing calculation on all content of the first data (or partial content of the first data, or a first operation log corresponding to sending of the first data) by using a first encryption algorithm, and the integrity measurement value of the first data is a second encrypted value obtained by performing calculation on all the content of the first data (or the partial content of the first data, or a second operation log corresponding to receiving of the first data) by using the first encryption algorithm. In one case, the verification server may determine whether the first encrypted value is consistent with the second encrypted value. If the first encrypted value is consistent with the second encrypted value, the verification server determines that the integrity verification on the first data succeeds, otherwise, the verification server determines that the integrity verification on the first data fails. In another case, the verification server may alternatively first decrypt the first encrypted value by using a first decryption algorithm corresponding to the first encryption algorithm, to obtain a first decrypted value, decrypt the second encrypted value by using the first decryption algorithm corresponding to the first encryption algorithm, to obtain a second decrypted value, and then determine whether the first decrypted value is consistent with the second decrypted value. If the first decrypted value is consistent with the second decrypted value, the verification server determines that the integrity verification on the first data succeeds, otherwise, the verification server determines that the integrity verification on the first data fails.

When the integrity verification on the first data fails, to enable the control and management device to sense a problem of consistency of the first data between the control and management device and the terminal device, the verification server may send an alarm message to the control and management device, to notify the control and management device that the first data on the terminal device is abnormal. After receiving the alarm message, to ensure that the terminal device can continue to run normally, the control and management device may further send the first data to the terminal device again, to indicate the terminal device to replace the locally stored first data with newly received first data, or indicate the terminal device to store newly received first data and add an aging flag to previously stored first data. The first data to which the aging flag is added cannot be used to guide the terminal device to process a packet, but the newly received first data is used to guide the terminal device to process the packet.

It should be noted that, for related descriptions and achieved effects of the verification server in the method 500, refer to related operations performed by the verification server and corresponding effect descriptions in the method 100.

Figure 7:
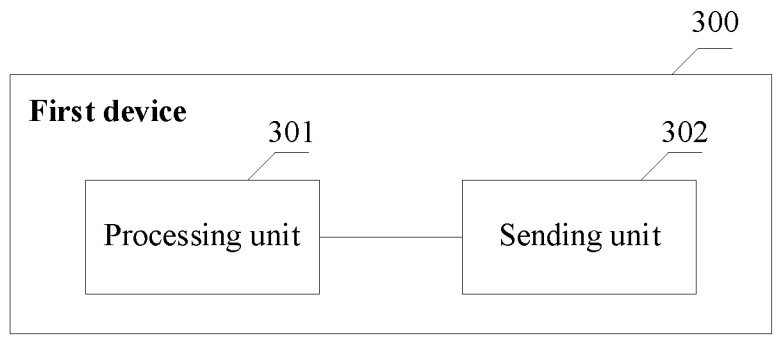
FIG. 7 is a schematic diagram of a structure of a first device according to an embodiment of this disclosure.

In addition, an embodiment of this disclosure further provides a first device 300, as shown in FIG. 7. The first device 300 includes a processing unit 301 and a sending unit 302. The processing unit 301 is configured to perform a processing operation performed by the control and management device in the embodiment shown in FIG. 2 and a processing operation performed by the control and management device 100 in the embodiment shown in FIG. 1. The sending unit 302 is configured to perform a sending operation performed by the control and management device in the embodiment shown in FIG. 2 and a sending operation performed by the control and management device 100 in the embodiment shown in FIG. 1. For example, the processing unit 301 may perform an operation in the embodiment in FIG. 2: Generate an integrity measurement baseline value corresponding to the first data. For example, the sending unit 302 may perform an operation in the embodiment in FIG. 2: Send first data to the terminal device, and send the integrity measurement baseline value to the verification server.

Figure 8:
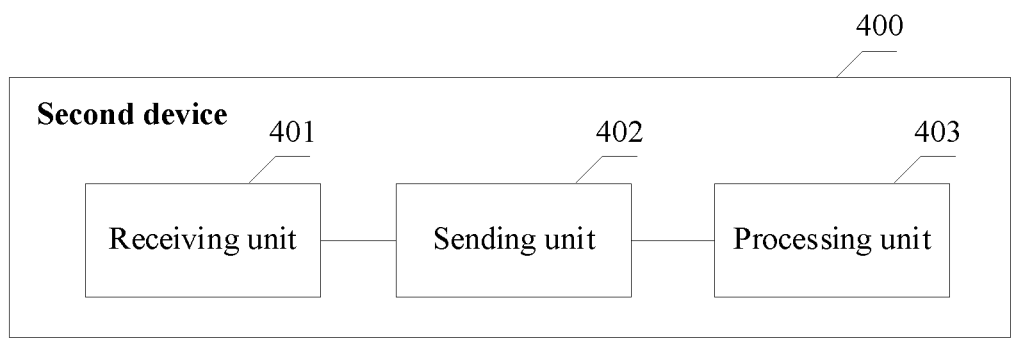
FIG. 8 is a schematic diagram of a structure of a second device according to an embodiment of this disclosure.

In addition, an embodiment of this disclosure further provides a second device 400, as shown in FIG. 8. The second device 400 includes a receiving unit 401, a sending unit 402, and a processing unit 403. The receiving unit 401 is configured to perform a receiving operation performed by the terminal device in the embodiment shown in FIG. 2 and a receiving operation performed by the terminal device 200 in the embodiment shown in FIG. 1. The sending unit 402 is configured to perform a sending operation performed by the terminal device in the embodiment shown in FIG. 2 and a sending operation performed by the terminal device 200 in the embodiment shown in FIG. 1. The processing unit 403 is configured to perform a processing operation performed by the terminal device in the embodiment shown in FIG. 2 and a processing operation performed by the terminal device 200 in the embodiment shown in FIG. 1. For example, the receiving unit 401 may perform an operation in the embodiment in FIG. 2: Receive the first data sent by the control and management device. The sending unit 402 may perform an operation in the embodiment in FIG. 2: Send the integrity measurement value corresponding to the first data to the verification server. The processing unit 403 may perform an operation in the embodiment in FIG. 2: Generate the integrity measurement value corresponding to the first data.

Figure 9:
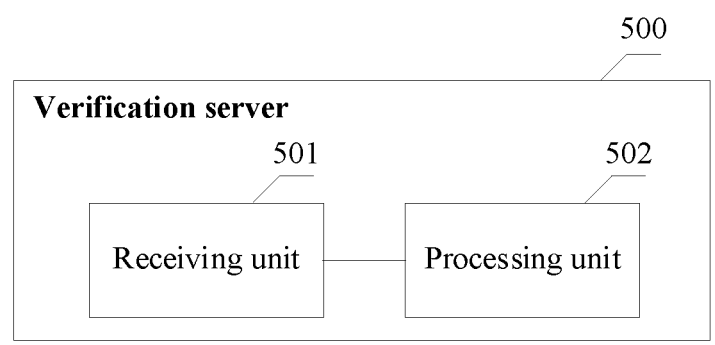
FIG. 9 is a schematic diagram of a structure of a verification server according to an embodiment of this disclosure.

In addition, an embodiment of this disclosure further provides a verification server 500, as shown in FIG. 9. The verification server 500 includes a receiving unit 501 and a processing unit 502. The receiving unit 501 is configured to perform a receiving operation performed by the verification server in the embodiment shown in FIG. 2 and a receiving operation performed by the verification server 400 in the embodiment shown in FIG. 1. The processing unit 502 is configured to perform a processing operation performed by the verification server in the embodiment shown in FIG. 2 and a processing operation performed by the verification server 400 in the embodiment shown in FIG. 1. For example, the receiving unit 501 may perform operations in the embodiment in FIG. 2: Receive the integrity measurement baseline value that corresponds to the first data and that is sent by the control and management device, and receive the integrity measurement value that corresponds to the first data and that is sent by the terminal device. The processing unit 502 may perform an operation in the embodiment in FIG. 2: Perform the integrity verification on the first data based on the integrity measurement baseline value and the integrity measurement value.

Figure 10:
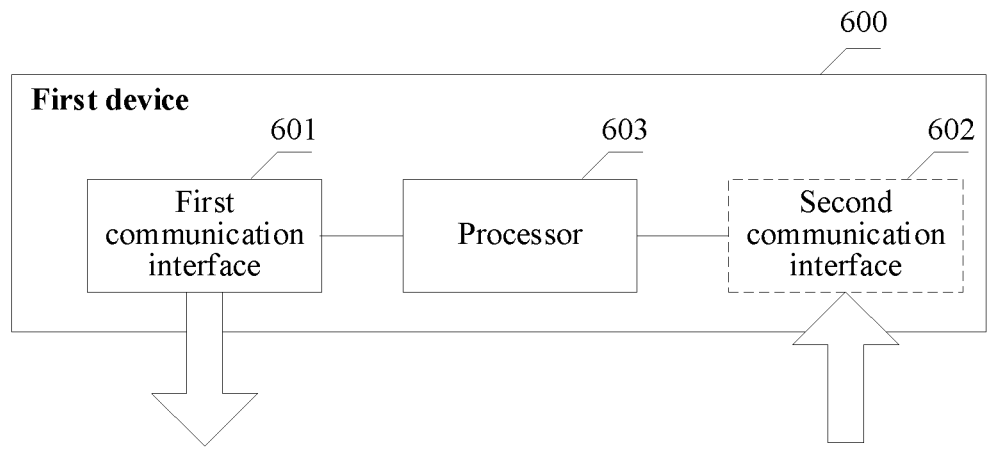
FIG. 10 is a schematic diagram of a structure of a first device according to an embodiment of this disclosure.

In addition, an embodiment of this disclosure further provides a first device 600, as shown in FIG. 10. The first device 600 includes a first communication interface 601 and a processor 603. The first communication interface 601 is configured to perform a sending operation performed by the control and management device in the embodiment shown in FIG. 2 and a sending operation performed by the control and management device 100 in the embodiment shown in FIG. 1. The processor 603 is configured to perform operations performed by the control and management device in the embodiment shown in FIG. 2 and the control and management device 100 in the embodiment shown in FIG. 1 other than the receiving operation and the sending operation. For example, the first communication interface 601 may perform an operation in the embodiment in FIG. 2: Send first data to the terminal device, and send the integrity measurement baseline value corresponding to the first data to the verification server. The processor 603 may perform an operation in the embodiment in FIG. 2: Determine the integrity measurement baseline value based on all content of the first data. The first device 600 may further include a second communication interface 602. The second communication interface 602 is configured to perform receiving operations performed by the control and management device in the embodiment shown in FIG. 2 and the control and management device 100 in the embodiment shown in FIG. 1.

Figure 11:
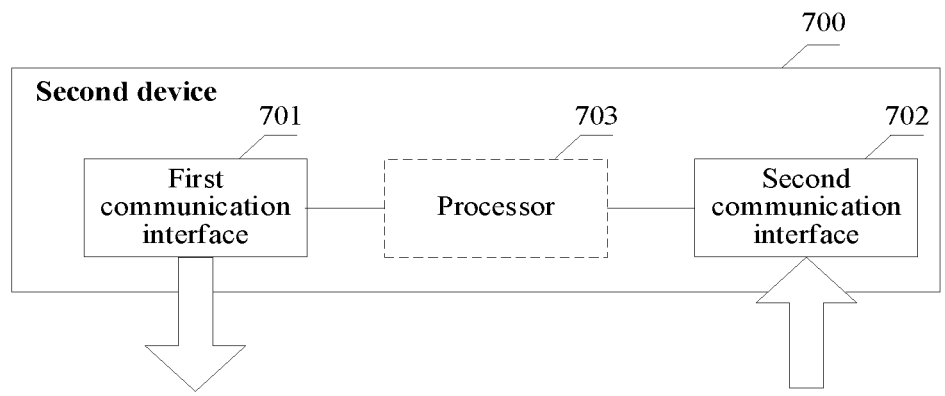
FIG. 11 is a schematic diagram of a structure of a second device according to an embodiment of this disclosure.

In addition, an embodiment of this disclosure further provides a second device 700, as shown in FIG. 11. The second device 700 includes a first communication interface 701 and a second communication interface 702. The first communication interface 701 is configured to perform sending operations performed by the terminal device in the embodiment shown in FIG. 2 and the terminal device 200 in the embodiment shown in FIG. 1. The second communication interface 702 is configured to perform receiving operations performed by the terminal device in the embodiment shown in FIG. 2 and the terminal device 200 in the embodiment shown in FIG. 1. For example, the first communication interface 701 may perform an operation in the embodiment in FIG. 2: Send the integrity measurement value corresponding to the first data to the verification server. The second communication interface 702 may perform an operation in the embodiment in FIG. 2: Receive the first data sent by the control and management device. In addition, the second device 700 may further include a processor 703. The processor 703 is configured to perform operations performed by the terminal device in the embodiment shown in FIG. 2 and the terminal device 200 in the embodiment shown in FIG. 1 other than the receiving operation and the sending operation.

Figure 12:
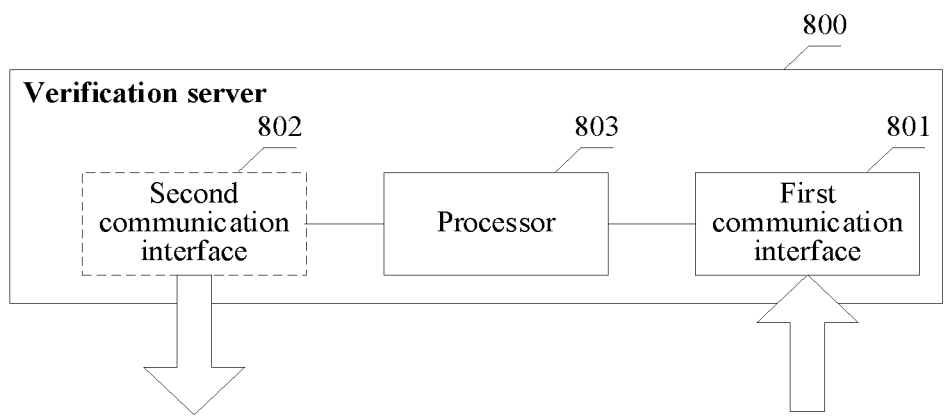
FIG. 12 is a schematic diagram of a structure of a verification server according to an embodiment of this disclosure.

In addition, an embodiment of this disclosure further provides a verification server 800, as shown in FIG. 12. The verification server 800 includes a first communication interface 801 and a processor 803. The first communication interface 801 is configured to perform receiving operations performed by the verification server in the embodiment shown in FIG. 2 and the verification server 400 in the embodiment shown in FIG. 1. The processor 803 is configured to perform operations performed by the verification server in the embodiment shown in FIG. 2 and the verification server 400 in the embodiment shown in FIG. 1 other than the receiving operation and the sending operation. For example, the first communication interface 801 may perform operations in the embodiment in FIG. 2: Receive the integrity measurement baseline value that corresponds to the first data and that is sent by the first device, and receive the integrity measurement value that corresponds to the first data and that is sent by the second device. The processor 803 may perform an operation in the embodiment in FIG. 2: Perform the integrity verification on the first data based on the integrity measurement baseline value and the integrity measurement value. The verification server 800 may further include a second communication interface 802. The second communication interface 802 is configured to perform sending operations performed by the verification server in the embodiment shown in FIG. 2 and the verification server 400 in the embodiment shown in FIG. 1.

Figure 13:
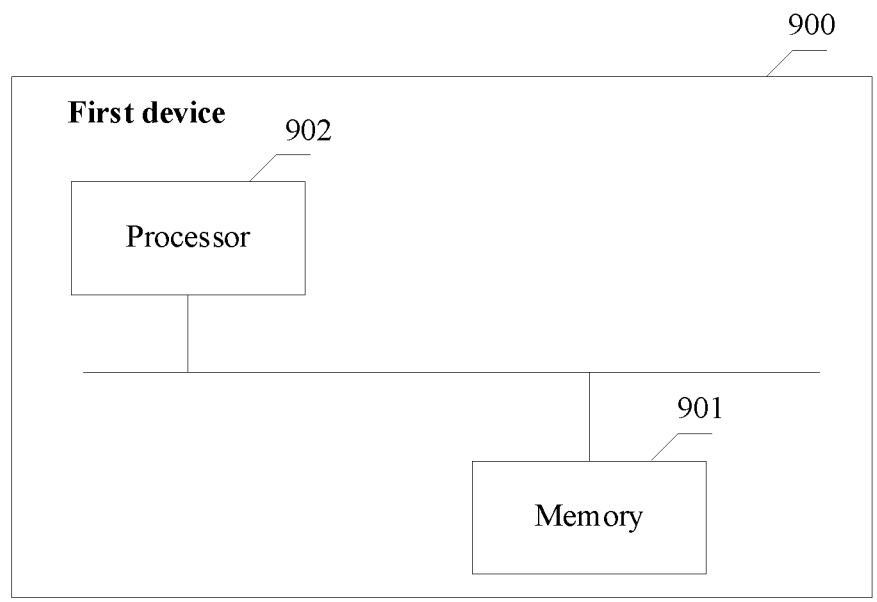
FIG. 13 is a schematic diagram of a structure of a first device according to an embodiment of this disclosure.

In addition, an embodiment of this disclosure further provides a first device 900, as shown in FIG. 13. The first device 900 includes a memory 901 and a processor 902 that communicates with the memory 901. The memory 901 includes computer-readable instructions. The processor 902 is configured to execute the computer-readable instructions, so that the first device 900 performs the method performed by the control and management device side in the embodiment shown in FIG. 2 and the method performed by the control and management device 100 in the embodiment shown in FIG. 1.

Figure 14:
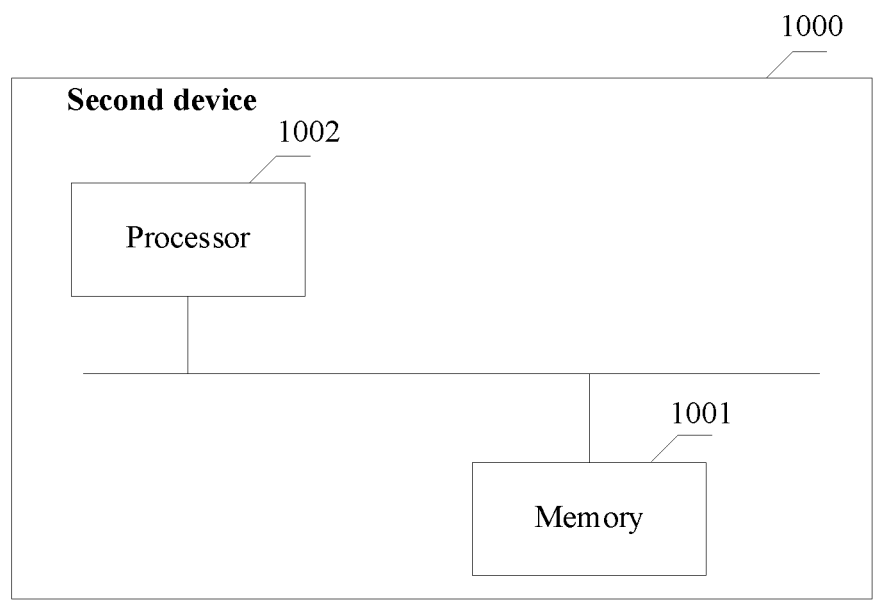
FIG. 14 is a schematic diagram of a structure of a second device according to an embodiment of this disclosure.

In addition, an embodiment of this disclosure further provides a second device 1000, as shown in FIG. 14. The second device 1000 includes a memory 1001 and a processor 1002 that communicates with the memory 1001. The memory 1001 includes computer-readable instructions. The processor 1002 is configured to execute the computer-readable instructions, so that the second device 1000 performs the method performed by the terminal device side in the embodiment shown in FIG. 2 and the method performed by the terminal device 200 in the embodiment shown in FIG. 1.

Figure 15:
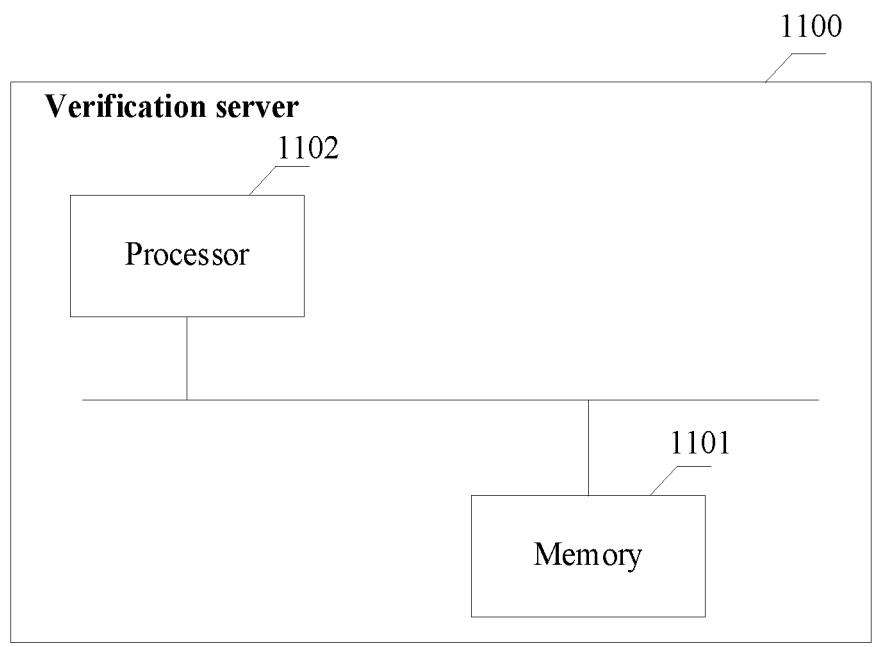
FIG. 15 is a schematic diagram of a structure of a verification server according to an embodiment of this disclosure.

In addition, an embodiment of this disclosure further provides a verification server 1100, as shown in FIG. 15. The verification server 1100 includes a memory 1101 and a processor 1102 that communicates with the memory 1101. The memory 1101 includes computer-readable instructions. The processor 1102 is configured to execute the computer-readable instructions, so that the verification server 1100 performs the method performed by the verification server side in the embodiment shown in FIG. 2 and the method performed by the verification server 400 in the embodiment shown in FIG. 1.

It may be understood that, in the foregoing embodiment, the processor may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor may be one processor, or may include a plurality of processors. The memory may include a volatile memory, for example, a random-access memory (RAM). The memory may further include a non-volatile memory, for example, a read-only memory (ROM), a flash memory, a hard disk drive (HDD), or a solid-state drive (SSD). The memory may further include a combination of the foregoing memories. The memory may be one memory, or may include a plurality of memories. In a specific implementation, the memory stores computer-readable instructions, and the computer-readable instructions include a plurality of software modules, for example, a sending module, a processing module, and a receiving module. After executing each software module, the processor may perform a corresponding operation based on an indication of each software module. In this embodiment, an operation performed by a software module is actually an operation performed by the processor based on an indication of the software module. After executing the computer-readable instructions in the memory, the processor may perform, based on indications of the computer-readable instructions, all operations that may be performed by devices or servers in integrity verification.

It may be understood that, in the foregoing embodiment, the first communication interface 601 of the first device 600 may be further used as the sending unit 302 in the first device 300 to implement data communication between the first device and the second device or the verification server. The processor 603 of the first device 600 may be further used as the processing unit 301 in the first device 300, for example, may be configured to determine the integrity measurement baseline value based on all content of the first data. Similarly, the first communication interface 701 of the second device 700 may be further used as the sending unit 402 in the second device 400, to implement data communication between the second device and the verification server. The second communication interface 702 of the second device 700 may be further used as the receiving unit 401 in the second device 400, to implement data communication between the first device and the second device. Similarly, the first communication interface 801 of the verification server 800 may be further used as the receiving unit 501 in the verification server 500, to implement data communication between the first device or the second device and the verification server. The processor 803 of the verification server 800 may be further used as the processing unit 502 in the verification server 500, for example, may be configured to perform the integrity verification on the first data based on the integrity measurement baseline value and the integrity measurement value.

Figure 16:
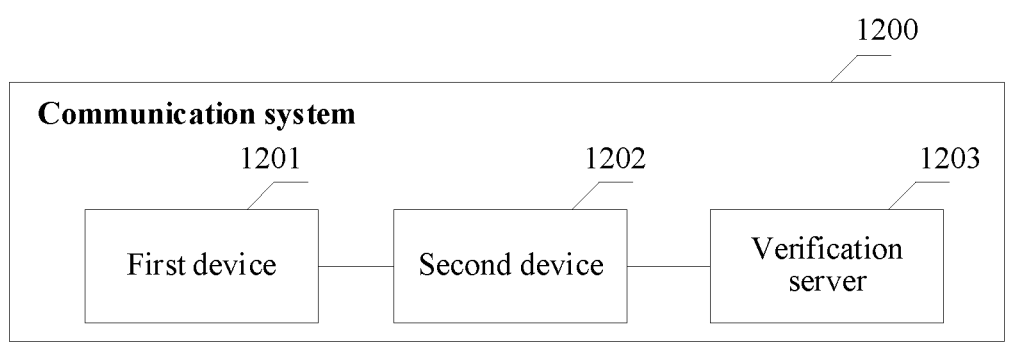
FIG. 16 is a schematic diagram of a structure of a communication system according to an embodiment of this disclosure.

In addition, an embodiment of this disclosure further provides a communication system 1200, as shown in FIG. 16. The communication system 1200 includes a first device 1201, a second device 1202, and a verification server 1203. The first device 1201 may be the first device 300, the first device 600, or the first device 900. The second device 1202 may be the second device 400, the second device 700, or the second device 1000. The verification server 1203 may be the verification server 500, the verification server 800, or the verification server 1100.

It should be noted that, the devices or the servers in the foregoing embodiments may be network devices configured to perform the foregoing methods, or may be boards, line cards, chips, or the like configured to perform the foregoing methods.

In addition, an embodiment of this disclosure further provides a computer-readable storage medium. The computer-readable storage medium stores instructions, and when the instructions are run on a computer, the computer is enabled to perform the integrity verification method in the embodiment shown in FIG. 1 or FIG. 2.

In addition, an embodiment of this disclosure further provides a computer program product, including a computer program or computer-readable instructions. When the computer program runs or the computer-readable instructions are run on a computer, the computer is enabled to perform the integrity verification method in the embodiment shown in FIG. 1 or FIG. 2.

From the foregoing descriptions of the implementations, a person skilled in the art may clearly understand that some or all steps of the methods in embodiments may be implemented by software in addition to a universal hardware platform. Based on such an understanding, the technical solutions of this disclosure may be implemented in a form of a software product. The computer software product may be stored in a storage medium, for example, a ROM/RAM, a magnetic disk, or a compact disc, and includes several instructions for instructing a computer device (which may be a personal computer, a server, or a network communication device such as a router) to perform the methods described in embodiments or some parts of embodiments of this disclosure.

Embodiments in this specification are all described in a progressive manner, for same or similar parts in embodiments, refer to these embodiments, and each embodiment focuses on a difference from other embodiments. Especially, system and device embodiments are basically similar to the method embodiments, and therefore are described briefly. For related parts, refer to partial descriptions in the method embodiments. The described device and system embodiments are merely examples. The modules described as separate parts may or may not be physically separate, and parts displayed as modules may or may not be physical modules, may be located in one position, or may be distributed on a plurality of network units. Some or all the modules may be selected based on actual needs to achieve the objectives of the solutions of embodiments. A person of ordinary skill in the art may understand and implement the embodiments without creative efforts.

The foregoing descriptions are merely example implementations of this disclosure, but are not intended to limit the protection scope of this disclosure. It should be noted that a person of ordinary skill in the art may make some improvements and polishing without departing from this disclosure and the improvements and polishing shall fall within the protection scope of this disclosure.

What is claimed is:

1. An integrity verification method implemented by a second device, wherein the integrity verification method comprises:
   receiving, from a first device, first data;
   receiving, from a verification server and/or from the first device, an indication indicating the second device to perform the integrity verification on the first data;
   obtaining, in response to the indication, an integrity measurement value based on a first operation log corresponding to the receiving of the first data; and
   sending, to the verification server, the integrity measurement value to enable the verification server to perform the integrity verification on the first data based on an integrity measurement baseline value received from the first device and the integrity measurement value, wherein the first device obtains the integrity measurement baseline value based on a second operation log corresponding to sending of the first data.

2. The integrity verification method of claim 1, further comprising: determining the integrity measurement value based on all content of the first data.

3. The integrity verification method of claim 1, wherein before sending the integrity measurement value, the integrity verification method further comprises: generating the integrity measurement value when a preset condition is satisfied.

4. The integrity verification method of claim 3, wherein the preset condition comprises at least one of:
   a total length of the first data reaches a preset length threshold;
   a quantity of entries comprised in the first data reaches a preset quantity threshold;
   an accumulated duration of receiving the first data reaches a preset duration; or the first data is incremental data.

5. A network system comprising:
   a first device having first one or more processors configured to execute first set of instructions to cause the first device to:
   send first data;
   obtain an integrity measurement baseline value based on a first operation log corresponding to sending of the first data; and
   send the integrity measurement baseline value corresponding to the first data;
   a second device coupled to the first device, the second device having second one or more processors configured to execute second set of instructions to cause the second device to:
   receive, from the first device, the first data;
   receive an indication indicating the second device to perform integrity verification on the first data;

obtain, in response to the indication, an integrity measurement value based on a second operation log corresponding to receiving of the first data; and send the integrity measurement value;

a verification server coupled to the first device and the second device, the verification server having third one or more processors configured to execute third set of instructions to cause the verification server to:

receive the integrity measurement baseline value from the first device;

receive the integrity measurement value from the second device; and perform the integrity verification on the first data based on the integrity measurement baseline value received from the first device and the integrity measurement value received from the second device.

6. The network system of claim 5, wherein the first one or more processors are further configured to execute the first set of instructions to cause the first device to determine the integrity measurement baseline value based on all content of the first data, and wherein the second one or more processors are further configured to execute the second set of instructions to cause the second device to further determine the integrity measurement value based on all content of the first data.

7. The network system of claim 5, wherein the first one or more processors are further configured to execute the first set of instructions to cause the first device to determine the integrity measurement baseline value based on partial content of the first data.

8. The network system of claim 5, wherein the first one or more processors are further configured to execute the first set of instructions to cause the first device to send the indication.

9. The network system of claim 5, wherein the third one or more processors are further configured to execute the third set of instructions to cause the verification server to send the indication.

10. The network system of claim 5, wherein before sending the integrity measurement value, the second one or more processors are further configured to execute the second set of instructions to cause the second device to generate the integrity measurement value when a preset condition is satisfied.

11. The network system of claim 10, wherein the preset condition comprises at least one of:

a total length of the first data reaches a preset length threshold;

a quantity of entries comprised in the first data reaches a preset quantity threshold;

an accumulated duration of receiving the first data reaches a preset duration; or the first data is incremental data.

12. A second device comprising:

a memory configured to store instructions; and one or more processors coupled to the memory and configured to execute the instructions to cause the second device to:

receive, from a first device, first data;

receive, from a verification server and/or from the first device, an indication indicating the second device to perform integrity verification on the first data;

obtain, in response to the indication, an integrity measurement value based on a first operation log corresponding to receiving of the first data; and send, to the verification server, the integrity measurement value to enable the verification server to perform the integrity verification on the first data based on an integrity measurement baseline value received from the first device and the integrity measurement value, wherein the first device obtains the integrity measurement baseline value based on a second operation log corresponding to sending of the first data.

13. The second device of claim 12, wherein the one or more processors are further configured to execute the instructions to cause the second device to further determine the integrity measurement value based on all content of the first data.

14. The second device of claim 12, wherein before sending the integrity measurement value, the one or more processors are further configured to execute the instructions to cause the second device to generate the integrity measurement value when a preset condition is satisfied.

15. The second device of claim 14, wherein the preset condition comprises at least one of:

a total length of the first data reaches a preset length threshold;

a quantity of entries comprised in the first data reaches a preset quantity threshold;

an accumulated duration of receiving the first data reaches a preset duration; or the first data is incremental data.

\* \* \* \* \*